United States Patent
Dawar et al.

(10) Patent No.: US 11,095,908 B2
(45) Date of Patent: Aug. 17, 2021

(54) POINT CLOUD COMPRESSION USING INTERPOLATION

(71) Applicant: Samsung Electronics Co., Ltd., Suwon-si (KR)

(72) Inventors: Neha Dawar, Plano, TX (US); Hossein Najaf-Zadeh, Allen, TX (US); Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/452,357

(22) Filed: Jun. 25, 2019

(65) Prior Publication Data

US 2020/0014940 A1 Jan. 9, 2020

Related U.S. Application Data

(60) Provisional application No. 62/695,646, filed on Jul. 9, 2018, provisional application No. 62/696,175, filed on (Continued)

(51) Int. Cl.
*H04N 19/20* (2014.01)
*H04N 19/80* (2014.01)
(Continued)

(52) U.S. Cl.
CPC ............. *H04N 19/20* (2014.11); *G06T 9/00* (2013.01); *H04N 19/172* (2014.11); *H04N 19/182* (2014.11); *H04N 19/80* (2014.11)

(58) Field of Classification Search
CPC ......... G06T 9/00; G06T 9/001; H04N 19/172; H04N 19/182; H04N 19/20; H04N 19/597; H04N 19/80
See application file for complete search history.

(56) References Cited

U.S. PATENT DOCUMENTS

2007/0211054 A1* 9/2007 Lee ..................... G06T 15/205
                                                          345/427
2011/0261877 A1* 10/2011 Choi
(Continued)

OTHER PUBLICATIONS

Guede et al., "Geometry image coding improvements", ISO/IEC JTC1/SC29/WG11 MPEG2016/M42111, Jan. 2018, 12 pages (Year: 2018).*

(Continued)

*Primary Examiner* — Jessica M Prince

(57) ABSTRACT

A decoding device, an encoding device and a method for point cloud decoding is disclosed. The method includes receiving a bitstream. The method also includes decoding the bitstream into a geometry frame and a texture frame. The geometry and texture frames represent include pixels representing points of the 3D point cloud from different layers. The method further includes deriving a set of missing geometry values from the pixels in the geometry frame and a set of missing texture values from the pixels in the texture frame. The method additionally includes generating a first set of frames representing geometry based on the geometry frame and the set of missing geometry values and generating a second set of frames representing texture based on the texture frame and the set of missing texture values. The method also includes generating the 3D point cloud using the first and second sets of frames.

20 Claims, 11 Drawing Sheets

Related U.S. Application Data on Jul. 10, 2018, provisional application No. 62/696,500, filed on Jul. 11, 2018, provisional application No. 62/757,817, filed on Nov. 9, 2018, provisional application No. 62/778,701, filed on Dec. 12, 2018, provisional application No. 62/820,923, filed on Mar. 20, 2019.

(51) Int. Cl.
*G06T 9/00* (2006.01)
*H04N 19/182* (2014.01)
*H04N 19/172* (2014.01)

(56) References Cited

U.S. PATENT DOCUMENTS

| | | | |
|---|---|---|---|
| 2014/0369423 A1 | 12/2014 | Bruls et al. | |
| 2017/0347122 A1 | 11/2017 | Chou et al. | |
| 2018/0053324 A1 | 2/2018 | Cohen et al. | |
| 2018/0268570 A1 | 9/2018 | Budagavi et al. | |
| 2019/0156519 A1* | 5/2019 | Mammou | H04N 19/172 |
| 2019/0313110 A1* | 10/2019 | Mammou | G06T 7/248 |
| 2020/0014953 A1* | 1/2020 | Mammou | H04N 19/597 |
| 2021/0006806 A1* | 1/2021 | Schwarz | H04N 19/597 |

OTHER PUBLICATIONS

Sebastian Schwartz et al., "2D Video Coding of Volumetric Video Data", 2018 Picture Coding Symposium, Jun. 24-27, 2018, 6 pages.

Marius Preda, "Point Cloud Compression in MPEG", MP20 Workshop, Oct. 28, 2017, 24 pages.

International Search Report dated Oct. 14, 2019 in connection with International Patent Application No. PCT/KR2019/008318, 3 pages.

Written Opinion of the International Searching Authority dated Oct. 14, 2019 in connection with International Patent Application No. PCT/KR2019/008318, 6 pages.

Dawar et al., "[V-PCC] CE2.11 Pixel interleaving in single layer coding", ISO/IEC JTC1/SC29/WG11 MPEG2018/m44931, Oct. 2018, 8 pages.

Dawar et al., "PCC TMC2 Interleaving in geometry and texture layers", ISO/IEC JTC1/SC29/WG11 MPEG2018/m43723, Jul. 2018, 11 pages.

Guede et al., "Geometry image coding improvements", ISO/IEC JTC1/SC29/WG11 MPEG2016/ M42111, Jan. 2018, 12 pages.

Schwarz et al., "Removal of second layer coding for PCC TMC2", ISO/IEC JTC1/SC29/WG11 MPEG2016/M42438, Feb. 2016, 8 pages.

Extended European Search Report regarding Application No. 19834723.9, dated May 26, 2021, 7 pages.

Guede et al., "Geometry and texture interpolation", ISO/IEC JTC1/SC29/WG11 MPEG2018/m43658, Jul. 2018, 4 pages.

* cited by examiner

POINT CLOUD COMPRESSION USING INTERPOLATION

CROSS-REFERENCE TO RELATED APPLICATION AND CLAIM OF PRIORITY

This application claims priority under 35 U.S.C. § 119(e) to U.S. Provisional patent Application No. 62/695,646, filed Jul. 9, 2018, U.S. Provisional Patent Application No. 62/696,175, filed Jul. 10, 2018, U.S. Provisional Patent Application No. 62/696,500, filed Jul. 11, 2018, U.S. Provisional Patent Application No. 62/757,817, filed Nov. 9, 2018, U.S. Provisional Patent Application No. 62/778,701, filed Dec. 12, 2018, and U.S. Provisional Patent Application No. 62/820,923, filed Mar. 20, 2019. The above-identified provisional patent applications are hereby incorporated by reference in its entirety.

TECHNICAL FIELD

This disclosure relates generally to multimedia data. More specifically, this disclosure relates to an apparatus and a method for compressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a Three-Degrees-of-Freedom (3DOF) immersive experience. Six-Degrees-of-Freedom (6DOF) is the next level of immersive experience where in the user can turn his head as well as move around in a virtual/augmented environment. Multimedia data that is three-dimensional (3D) in nature, such as point clouds, is needed to provide 6DOF experience.

Point clouds and meshes are a set of 3D points that represent a model of a surface of an object or a scene. Point clouds are common in a variety of applications such as gaming, 3D maps, visualizations, medical applications, augmented reality, virtual reality, autonomous driving, multi-view replay, 6DOF immersive media, to name a few. Point clouds, if uncompressed, generally require a large amount of bandwidth for transmission. Due to the large bitrate requirement, point clouds are often compressed prior to transmission.

SUMMARY

This disclosure provides point cloud compression using interpolation.

In a first embodiment, a decoding device for point cloud decoding is provided. The decoding device includes a communication interface and a processor that is operably coupled to the communication interface. The communication interface is configured to receive a compressed bitstream. The processor is configured to decode the compressed bitstream into a geometry frame representing geometry of a 3D point cloud and a texture frame representing texture of the 3D point cloud. The geometry frame and the texture frame include pixels representing points of the 3D point cloud from different layers of the 3D point cloud. The processor is also configured to derive a set of missing geometry values from the pixels in the geometry frame and a set of missing texture values from the pixels in the texture frame. The processor is further configured to generate a first set of frames representing geometry from the different layers of the 3D point cloud based on the geometry frame and the set of missing geometry values. The processor is also configured to generate a second set of frames representing the texture from the different layers of the 3D point cloud based on the texture frame and the set of missing texture values. The processor is additionally configured to generate the 3D point cloud using the first set of frames and the second set of frames.

In another embodiment an encoding device for point cloud encoding is provided. The encoding device includes a processor and a communication interface operably coupled to the processor. The processor is configured to generate, for a 3D point cloud, a first set of frames representing geometry from different layers of the 3D point cloud and a second set of frames representing texture from the different layers of the 3D point cloud. The first set of frames and the second set of frames include pixels representing the 3D point cloud. The processor is also configured to generate a geometry frame and a texture frame by combining a portion of the pixels included in the first set of frames and a portion of the pixels included the second set of frames, respectively. The processor is further configured to encode the geometry frame and the texture frame to generate a compressed bitstream. The communication interface is configured to transmit the compressed bitstream.

In yet another embodiment a method for decoding is provided. The method includes receiving a compressed bitstream. The method also includes decoding the compressed bitstream into a geometry frame representing geometry of a 3D point cloud and a texture frame representing texture of the 3D point cloud. The geometry frame and the texture frame include pixels representing the 3D point cloud from different layers of the 3D point cloud. The method additionally includes deriving a set of missing geometry values from the pixels in the geometry frame and a set of missing texture values from the pixels in the texture frame. The method further includes generating a first set of frames representing geometry from the different layers of the 3D point cloud based on the geometry frame and the set of missing geometry values. Additionally, the method includes generating a second set of frames representing the texture from the different layers of the 3D point cloud based on the texture frame and the set of missing texture values. The method also includes generating the 3D point cloud using the first set of frames and the second set of frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates example two frames representing different layers of a 3D point cloud and an interleaved frame in accordance with an embodiment of this disclosure;

FIGS. 6A and 6B illustrates an example interleaved frame, an interpolated frame, and generated frames for reconstructing the 3D point cloud in accordance with an embodiment of this disclosure;

DETAILED DESCRIPTION

Figure 1:
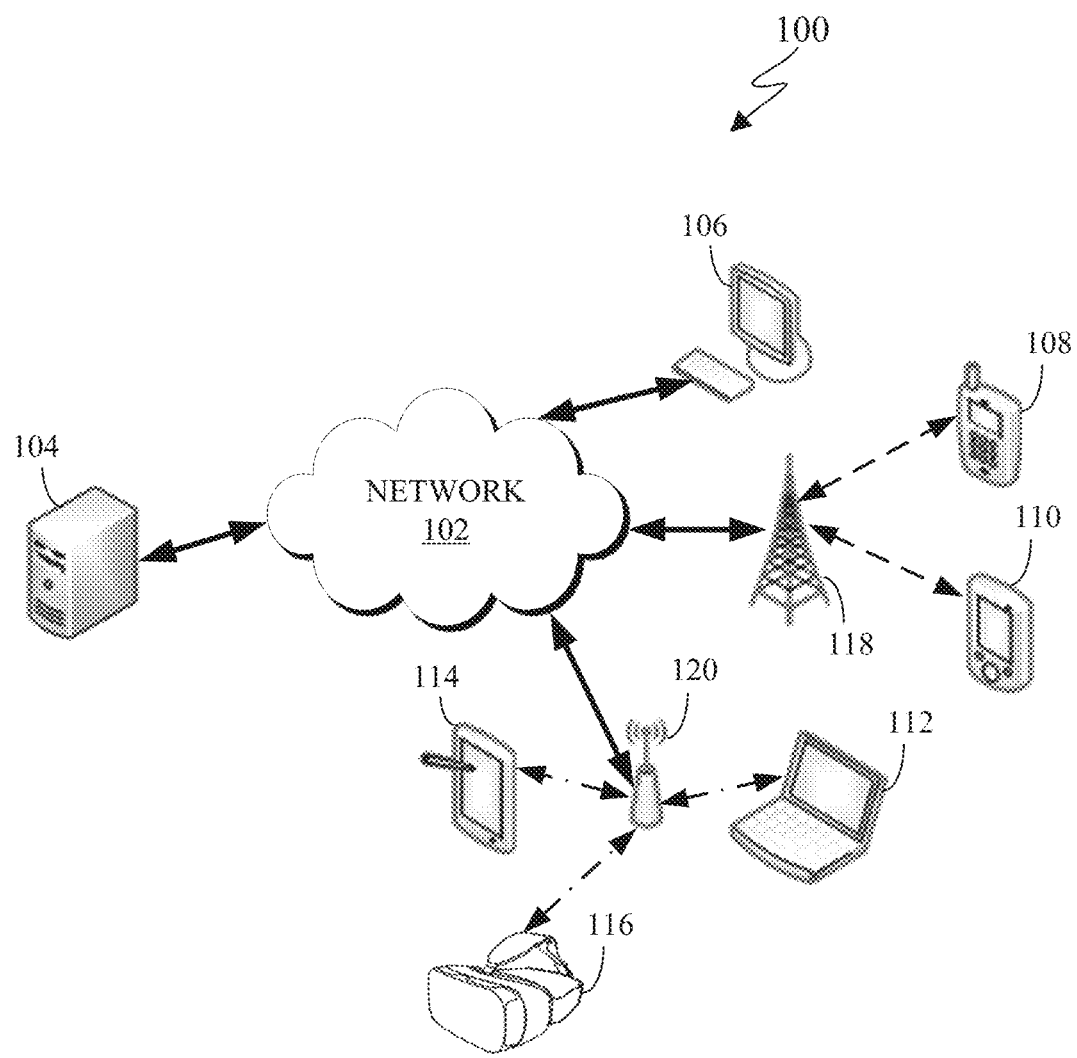
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD is a device that enables a user to view the VR scene and adjust the displayed content based on movements of the head of the user. A HMD represent one of many types of devices that provide AR and VR experiences to a user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes or textures. A point cloud can be similar to an object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of multiple 3D points positioned in 3D space. Each point in a 3D point cloud includes an attribute such as a geometric position, represented by 3-tuple (X,Y,Z) coordinate values. When each point is identified by the three coordinates, a precise location in 3D environment or space is identified. In certain embodiments, the location in 3D environment or space of each point is relative to an origin or relative to other points of the point cloud, or a combination thereof. The origin is a location where the X, Y, and Z axis intersect. In certain embodiments, the points are positioned on the external surface of the object. In certain embodiments, the points are positioned throughout the internal structure and external surfaces of the object. Additionally, depending upon the application, each point in the point cloud can also include one or more textures such as color, reflectance, intensity, surface normal, and the like. In some embodiments, a single point of a 3D point cloud can have multiple attributes. A texture can refer to an attribute other than the geometry attribute. A first attribute can represent the geometric position of a point, while a second attribute or texture can represent the color of the point, a third attribute or texture can represent the reflectiveness of the point, and yet the point can further be represented by additional attributes or textures such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B triplets).

As discussed above, a point cloud includes points, where each point is associated with a geometry position and one or more attributes. A single point cloud can include billions of points, with each point associated with a geometric position and one or more attributes. A geometric position and each attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten bit geometric attribute data, per coordinate, and an eight bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times 30 frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the rendering of the point cloud; however such hardware components are often expensive. Compressing and decompressing a point cloud by leveraging existing video codecs enables the encoding and decoding of a point cloud to be widely available without the need for new or specialized hardware. However, many video codecs are not able to encode and decode 3D video content, such as a point cloud. According to embodiments of the present disclosure, leveraging existing video codecs can be used to compress and reconstruct a point cloud, when the point cloud is converted from a 3D state to a 2D state. In certain embodiments, the conversion of a point cloud includes projecting the 3D point cloud onto 2D frames by creating patches that represent the point cloud. Thereafter, video codecs such as HEVC, AVC, VP9, VP8, JVNET, and the like can be used to compress the 2D frames representing the 3D point cloud similar to a 2D video.

Converting the point cloud includes projecting the point cloud to generate multiple patches and packing the patches onto one or more 2D frames, such that the frames can be compressed, and then transmitted to a display device. The frames can represent projections at different layers of the point cloud. The frames can also represent different attributes or textures of the point cloud, such as one frame includes geometry positions of the points and another frame includes color information associated with each of the points. A decoder reconstructs the patches within the 2D frames into the 3D point cloud, such that the point cloud can be viewed by a user. When the point cloud is deconstructed to fit on multiple frames (such as the 2D frames), and compressed the frames can be transmitted using less bandwidth than transmitting the original point cloud.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. In other embodiments, the patches on one frame represent multiple attributes associated with the points of the point cloud, such as a geometric position of the points in 3D space and color.

According to embodiments of the present disclosure, architecture for performing point cloud compression and decompression using a video codec is provided. In certain embodiments, an encoder projects the point cloud onto multiple frames. The encoder can project the point cloud at different surface depths or layers onto respective frames. For example, if the encoder projects the point cloud based on two different layers, then two frames for each attribute can be generated. For instance, a first frame can include geometry (the geometric location in 3D space of each point) at the first layer, a second frame can include geometry (the geometric location in 3D space of each point) at the second layer, a third frame can include color of the points at the first layer, and a fourth frame can include color of the second layer. Similarly, the more attributes that are used to define the 3D point cloud also increases the number of frames that are generated. The encoder projects the 3D point cloud onto the multiple 2D frames and generates a bitstream. The encoder or another device then transmits the bitstream to different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and texture information of these patches are packed into geometry video frames and texture video frames, respectively. The geometry video frames are used to encode the geometry information, and the corresponding texture video frames are used to encode the texture (or other attributes) of the point cloud. Each point within a patch in the geometry video frame corresponds to a point in 3D space. The two transverse coordinates (with respect to the projection plane) of a 3D point corresponds to the column and row indices in the geometry video frame plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

Projecting a point in 3D space, from a point cloud, onto 2D frames certain points of the 3D point cloud can be missed, and not included in any of the 2D frames. Thereafter, when the point cloud is reconstructed, by the decoder, cracks and holes can be introduced in the reconstructed could cloud, as certain points were not transmitted from the original 3D point cloud. A point is missed when it is not projected from 3D point cloud to a patch on a 2D video frame. Missed points generally occur near regions of high curvature in the point cloud surface or due to self-occlusions. Additionally, some isolated 3D points are not included in the regular patches as these points they fail to comply with the constraints imposed during the projection onto the 2D frames. For example, the constraints can include a maximum depth constraint, distance from other points in the neighborhood, and the like.

Additionally, if two or more points are projected to the same pixel location, then one of those points can be missed. Since multiple points can be projected to the same pixel location on a 2D frame, multiple projections can be captured at different depths or layers. A near layer stores the points which are closest to the projection plane, while a far layer stores points a further distance from the projection plane. Layers represent different depth values for the same position on the 2D image. For example, if have a patch which is projected onto XY plane, the different layers represent different z values for the patch. A surface thickness is a parameter chosen by the encoder representing the maximum allowable distance between the near layer and the far layer. The encoder can use surface thicknesses to limit the maximum difference between consecutive layer depth values. In certain embodiments, two geometry video frames and two texture video frames are generated by the encoder, which represent a 3D point cloud. In certain embodiments, layers are generated by taking more projections at different depths. The multiple layers represent the same projection but at different depths into the point cloud. A first layer can store values that are closest to the projection plane, while a second layer can store values further from the projection plane.

Embodiments of the present disclosure also provide systems and methods for improving the transmission and reconstruction of a 3D point cloud. Improving the transmission and reconstruction of a 3D point cloud reduces the bandwidth required for the transmission as well as reduces the processing power required to reconstruct the 3D point cloud. For example, the transmission of a bitstream can be improved by reducing the number of frames that are transmitted from the encoder to a decoder.

Embodiments of the present disclosure provide for generating a single frame that includes two or more depths or layers. Generating a single frame from multiple frames that represent the 3D point cloud from different depths or layers reduces the number of frames that are transmitted. Reducing the number of frames that are transmitted reduces the bandwidth used to transmit the bitstream. Embodiments of the present disclosure also provide systems and methods for interpolating and reconstructing the multiple frames from a single frame. Improving the transmission and reconstruction of a 3D point cloud enables an increased availability for 3D point clouds. Improving the transmission and reconstruction of a 3D point cloud provides for increased availability for the bitstream to be streamed to the decoder and display device to render media content including the 3D point cloud.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
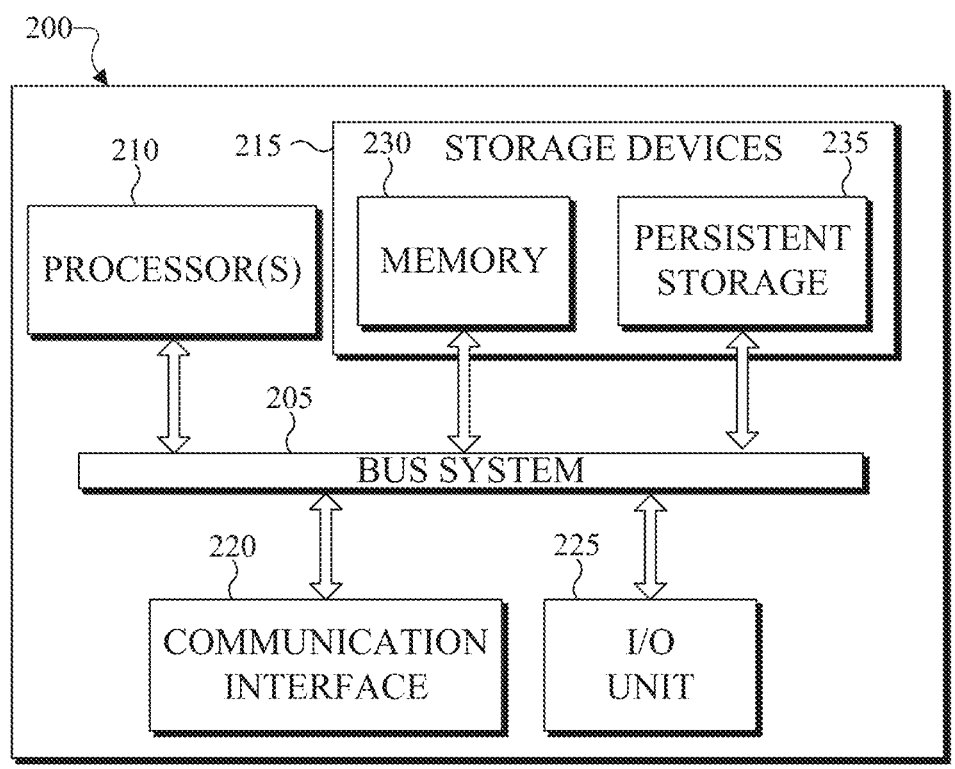
FIGS. 2 and 3 illustrate example electronic devices in accordance with an embodiment of this disclosure.
Figure 3:
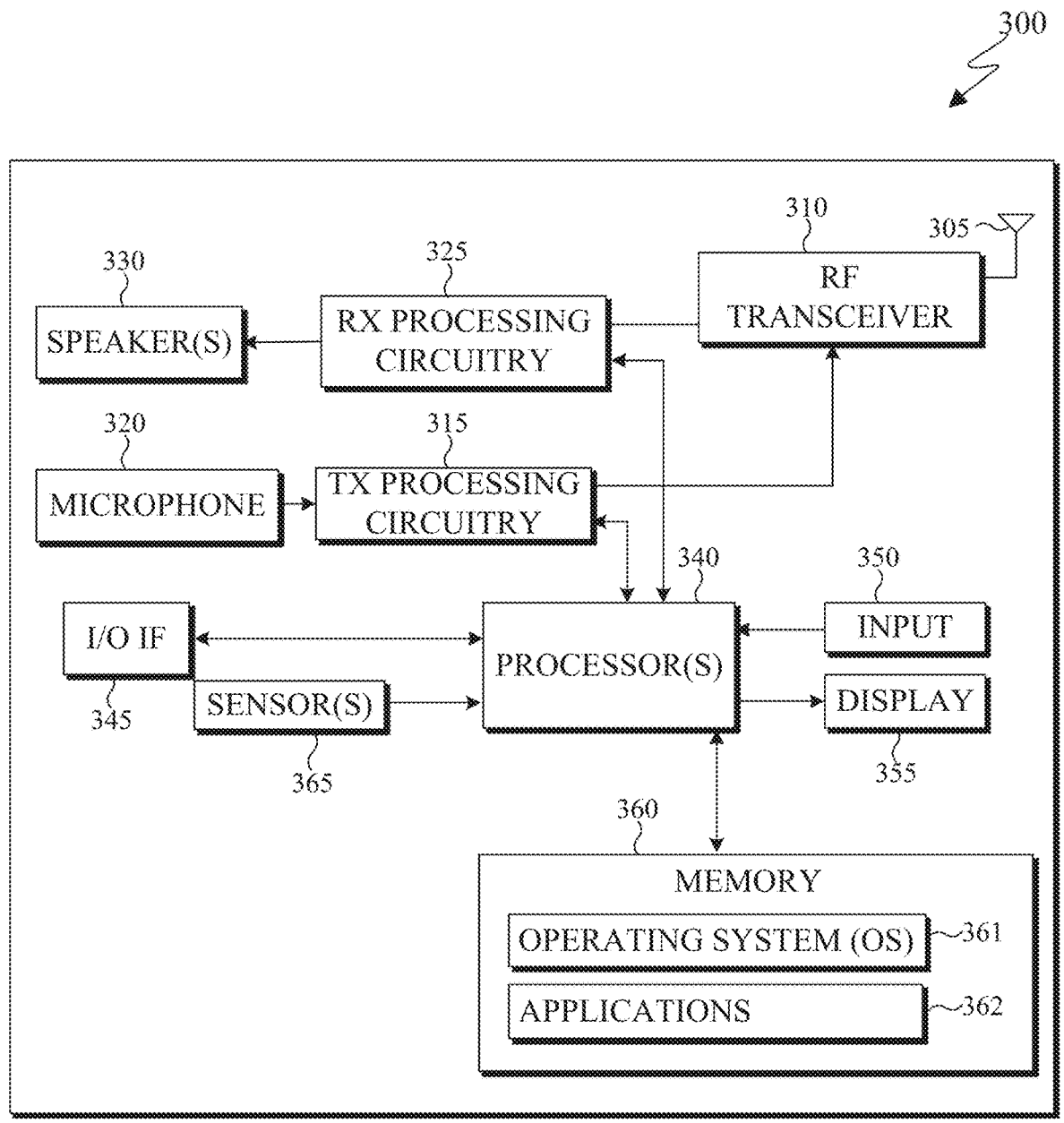

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. The 2D frames are then encoded to generate a bitstream. During the encoding process additional content can be included such as metadata, flags, occupancy maps, and the like.

Similarly, when decoding media content, such as a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, or any combination thereof. A geometry frame can include points that indicate coordinates, such as a geographic location of each point of a point cloud. Similarly, a color frame can include points that indicate the RGB color of each geometric point of the point cloud. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
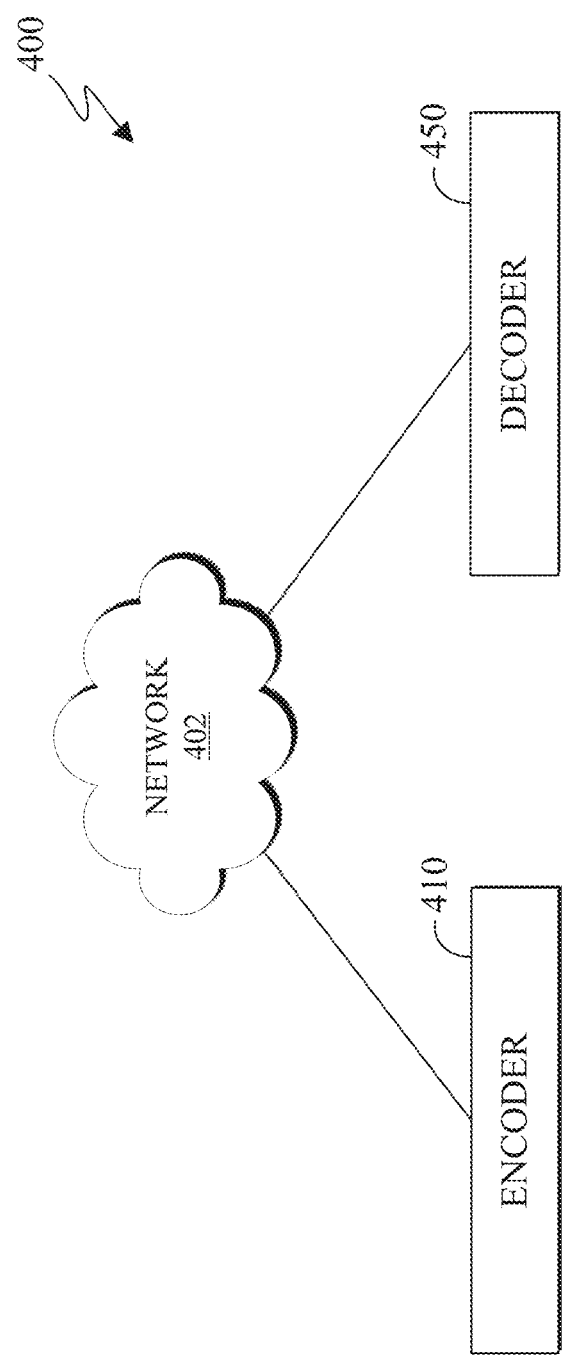
FIG. 4A illustrates a block diagram of an example environment-architecture in accordance with an embodiment of this disclosure.
Figure 4B:
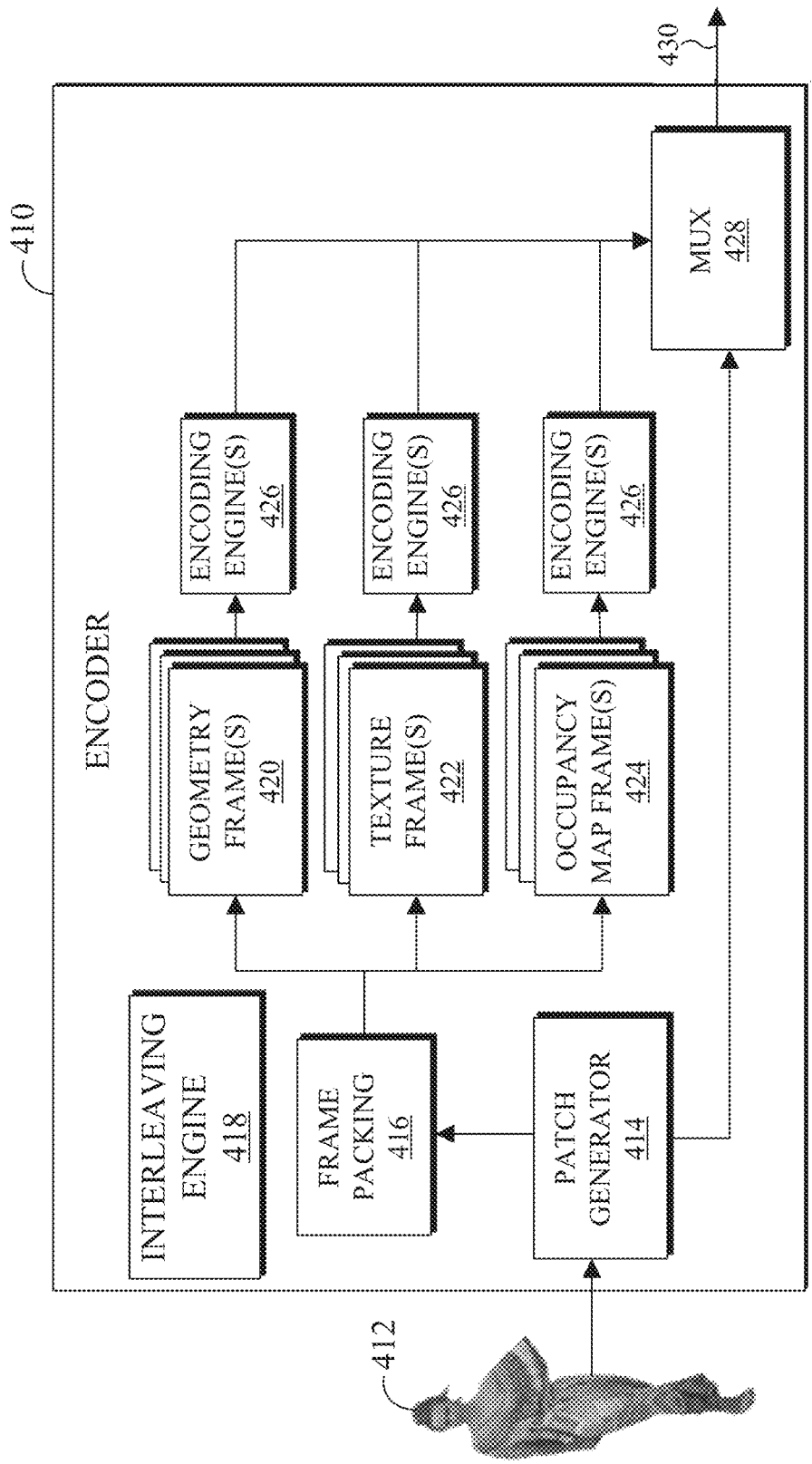
FIG. 4B illustrates an example block diagram of an encoder in accordance with an embodiment of this disclosure.
Figure 4C:
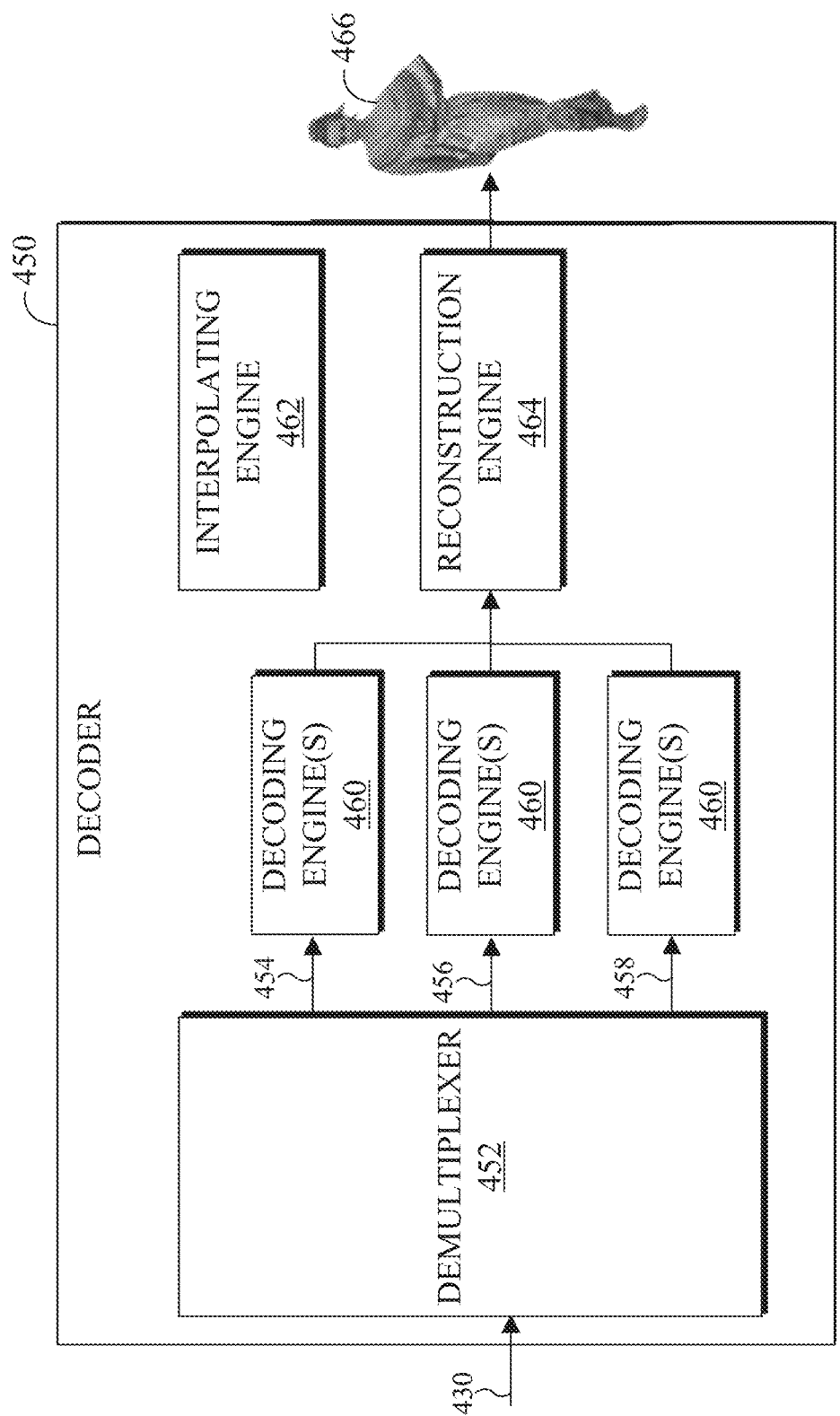
FIG. 4C illustrates an example block diagram of a decoder in accordance with an embodiment of this disclosure.

FIG. 4A illustrates a block diagram of an example environment-architecture 400 in accordance with an embodiment of this disclosure. As shown in FIG. 4A, the example environment-architecture 400 includes an encoder 410 and a decoder 450 in communication over a network 402. FIG. 4B illustrates an example block diagram of the encoder 410 of FIG. 4A in accordance with an embodiment of this disclosure. FIG. 4C illustrates an example block diagram of the decoder 450 of FIG. 4A in accordance with an embodiment of this disclosure. The embodiments of FIGS. 4A, 4B, and 4C are for illustration only. Other embodiments can be used without departing from the scope of this disclosure.

The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains a VR and AR media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, the server 200 of FIG. 2, the electronic device 300 of FIG. 3, or another suitable device. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 is described with more below in FIG. 4B. Generally, the encoder 410 receive 3D media content, such as a point cloud, from another device such as a server (similar to the server 104 of FIG. 1, the server 200 of FIG. 2) or an information repository (such as a database). In certain embodiments, the encoder 410 can receive media content from multiple cameras and stitch the content together to generate a 3D scene that includes one or more point clouds.

In certain embodiments, the encoder 410 projects a point cloud into two dimensions which create patches that represent the projection. The encoder 410 clusters points of a point cloud into groups which are projected onto different planes such as an XY plane, an YZ plane, and an XZ plane. Each cluster of points is represented by a patch when projected onto a plane. The encoder 410 can project a point cloud into two dimensions. The clusters of points that are projected from each layer are similar as they represent the same projection but of different depths within the point cloud. The encoder 410 packs the cluster of points or patches representing the point cloud onto 2D video frames. After the points of the point cloud are projected onto a 2D frame, the points are referred to as pixels or points interchangeably. The 2-D video frames can include different layers, and the difference between the depths of two layers is representative of the surface thickness. Additionally, each video frames can also represent a particular attribute, such as one frame can represent geometry and another frame can represent a texture. It should be noted that additional frames can be generated based on more layers as well as each additionally defined texture.

The encoder 410 can also map the patches to the locations of each patch on the 3D point cloud, such that each point in one of the frames is identifiable by the patch, (such as the cluster of pixels) that the point originated from. Similarly, a patch identifier can be generated that associates each point within a frame to a particular patch to which the point belongs to.

Figure 5:
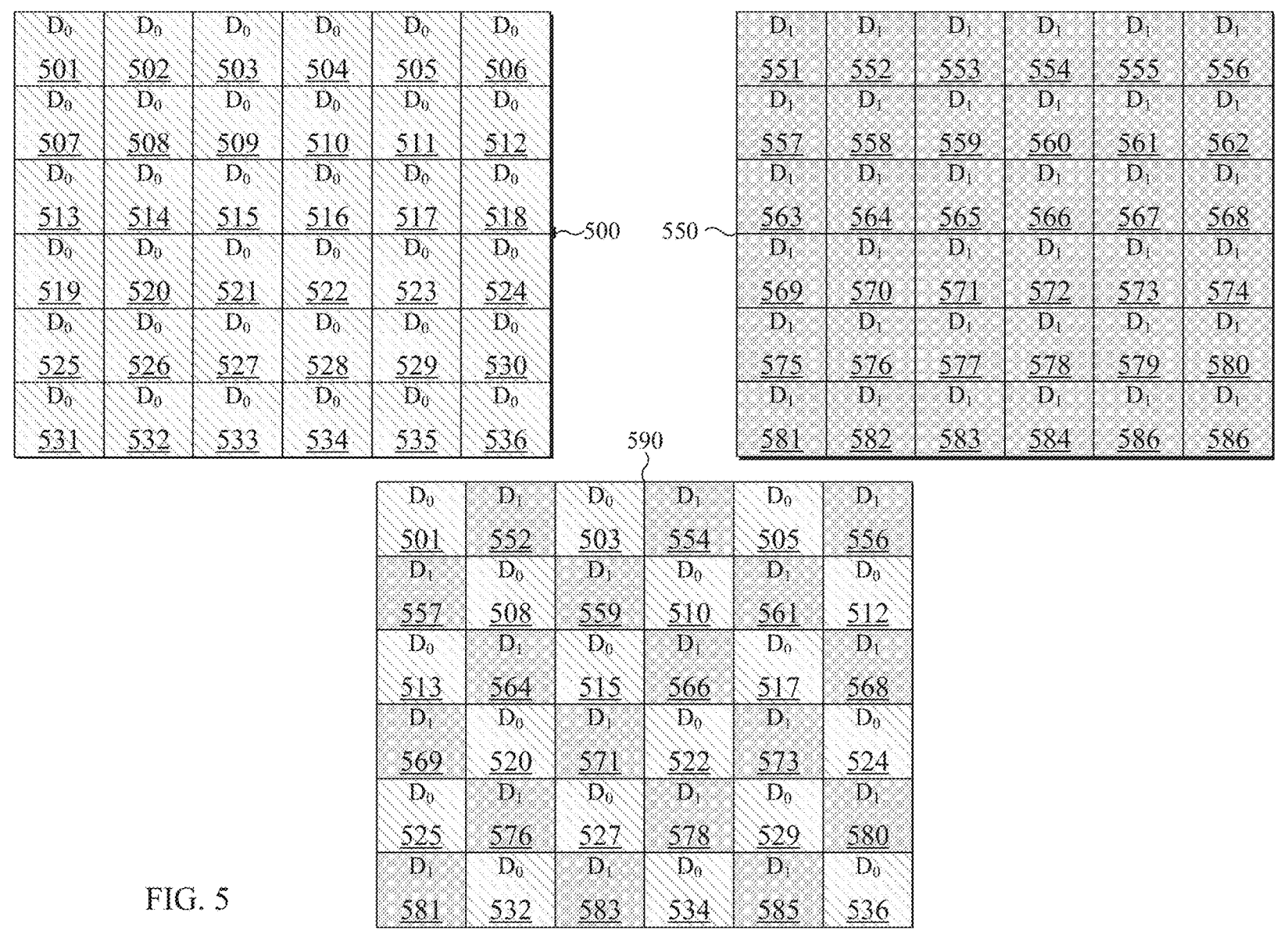

After packing the patches into multiple video frames, the encoder 410 can generate a single frame that includes a portion of the pixels from each frame representing different layers. Instead of encoding two layers for geometry, the encoder 410 generates a frame that includes both layers. For example, the portion of the pixels from each frame that are included in the single frame can include interleaved alternating pixel values from the frames representing different surface thicknesses. The frames representing different layers can be denoted as $D_0$ and $D_1$, where $D_0$ represents a frame including points from the first layer while $D_1$ represents a frame including points from the second layer. The first layer and the second layer represent depth values of the same position. The surface thickness limits the maximum difference between consecutive layer depth values. In a similar notation, $D_2$ represents the new frame (which is a combination of the frames $D_0$ and $D_1$). In certain embodiments, additional notations can be used to indicate each additional layer. The examples below can be expanded to include three or more layers. As used herein $D_0$ and $D_1$ can indicate a geometry frame as well as a texture frame. FIG. 5 described in greater detail below, illustrates interleaving two frames together to generate a single frame.

Thereafter, the encoder 410 encodes the multiple single frames for transmission. For example, a portion of a first frame and a second frame can be selected and used to create a single frame, where the first and second frame present different layers of the geometry of the 3D point cloud. Similarly, a portion of a third frame and a fourth frame can be selected and used to create a single frame, where the third and fourth frame present different layers of a texture, such as color, of the 3D point cloud.

The encoder 410 transmits frames representing the point cloud as an encoded bitstream. The bitstream can be transmitted to an information repository (such as a database) or an electronic device that includes a decoder (such as the decoder 450), or the decoder 450 itself through the network 402. The encoder 410 is described with more below in FIG. 4B.

The decoder 450 is described with more below in FIG. 4C. Generally, the decoder 450 can receive a bitstream that represents media content, such as a point cloud. The bitstreams can include frames representing a 3D point cloud. The decoder 450 can decode the bitstream and generate the point cloud from multiple frames. In certain embodiments, one or more flag indicates whether a frame includes points from the same layer or from two or more layers. In other embodiments, the decoder 450 identifies via the metadata associated with a frame whether the frame includes points from the same layer or from two or more layers.

Figure 6A:
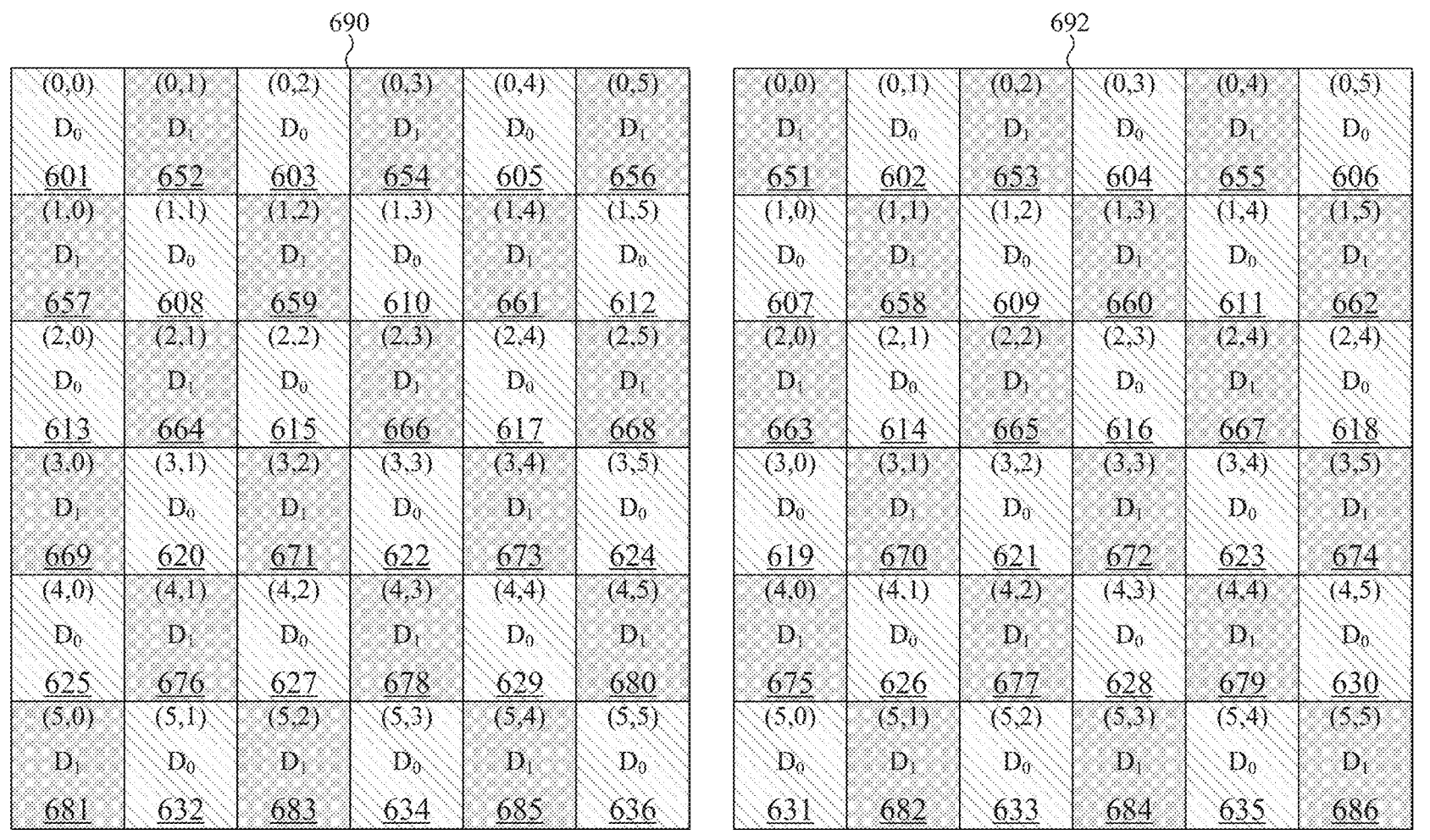
Figure 6B:
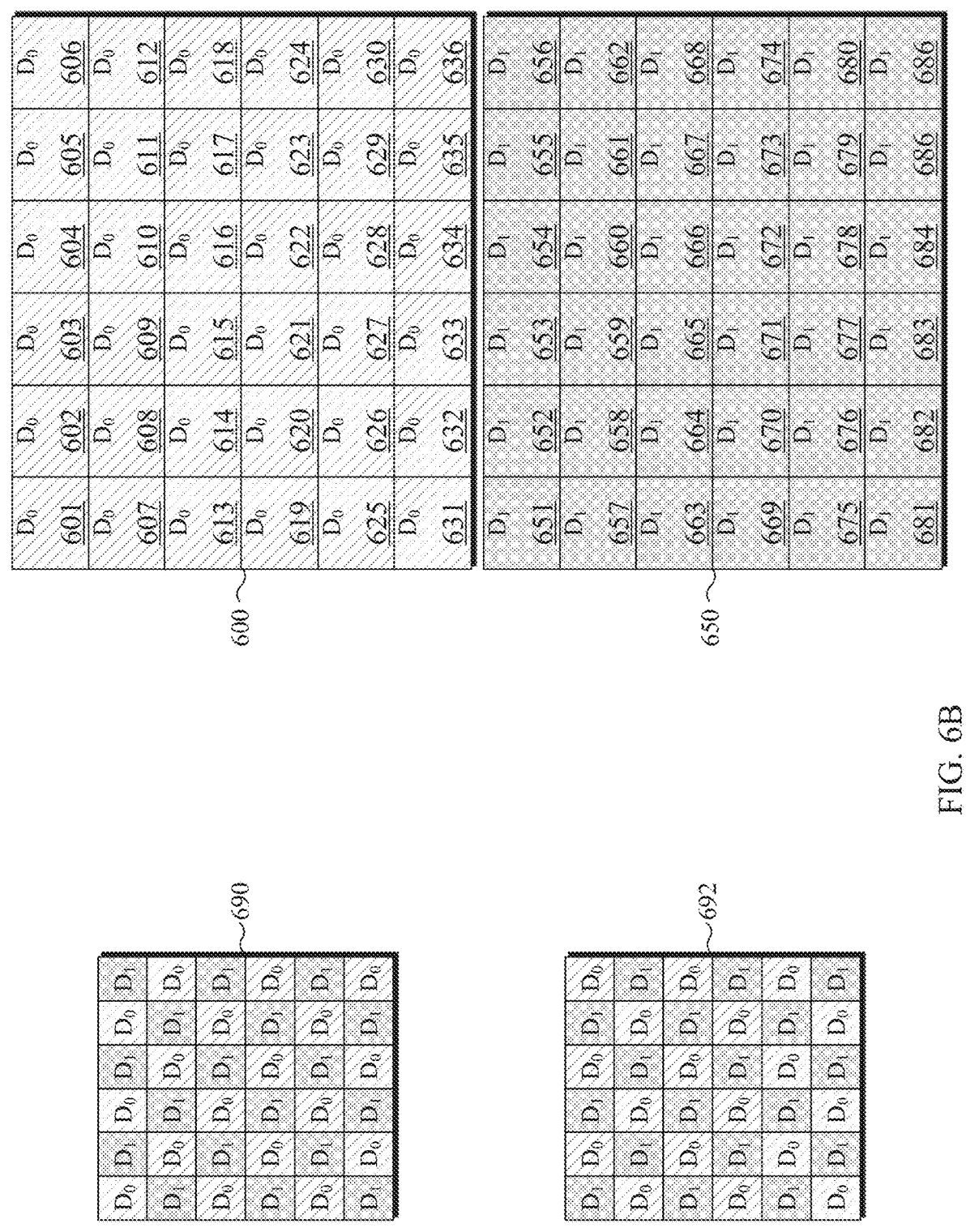

If a single frame includes points from different layers, then the decoder 450 interpolates and derives values for the missing points in order to generate the multiple frames that represent the points from each layer. Predicting and interpolating missing values is based on neighboring pixels in a frame of the same layer that belong to the same patch as the missing pixel. FIGS. 6A and 6B, described in greater detail below, illustrate interpolating and generating frames that are needed for reconstructing the point cloud.

After predicting and interpolating missing values, the decoder 450 reconstructs the 3D point cloud. The reconstructed 3D point cloud can then be rendered and displayed to a user, or saved locally and displayed at a later time.

FIG. 4B illustrates the encoder 410 which receives a 3D point cloud 412 and generates a bitstream 430. The encoder 410 includes a patch generator 414, a frame packing 416, a interleaving engine 418, various frames (such as one or more geometry frames 420, one or more texture frames 422, and one or more occupancy map frames 424), one or more encoding engines 426 and a multiplexer 428. The 3D point cloud 412 can be stored in memory (not shown) or received from another electronic device (not shown). The 3D point cloud 412 can be a single 3D object, or a grouping of 3D objects. The 3D point cloud 412 can be stationary or move such as video. The encoder 410 generates the bitstream 430 which can include multiple bitstreams and can be transmitted via the network 402 of FIG. 4A to another device, such as the decoder 450.

The patch generator 414 generates patches by projecting a 3D point cloud 412 onto a 2D surface, or frame. For example, for each input point cloud, such as the 3D point cloud 412, the geometry and various textures (such as color) are clustered using one or more criteria. The criteria include a normal direction, a distance to projected frames, contiguity, and the like. After the geometry and the attribute are clustered, the geometry and the texture are projected onto planes, such as the XY plane, the YZ plane, or the XZ plane. Each cluster appears as patch wen projected on a plane.

For example, multiple frames of the same 3D point cloud using two or more projection planes can be generated. In certain embodiments, the patch generator 414 splits geometry aspects of each point of the 3D point cloud 412 and the texture components of each point of the 3D point cloud 412, which are placed on respective geometry frames 420 or the texture frames 422.

The patches can be from different depths of the 3D point cloud. For example, a first patch can be from a first projection plane that is tangential to the outermost point of the point cloud and another patch can be from a second projection plan that is a predefined distance from the first projection plane.

The frame packing 416 organizes the patches by attribute, such as geometry, color and other types of texture such as reflectiveness, material, and the like. Geometry (such as the geometry frames 420) represent is the geographic location of each point of the 3D point cloud 412. Texture (such as the texture frames 422) represents a single aspect of each point of the 3D point cloud 412, such as color. Each geometry frame 420 has at least one corresponding texture frame 422. For example, if the geometry frame 420 indicates where each point of the 3D point cloud 412 is in 3D space, then the corresponding texture frame 422 can indicate the color of each corresponding point. In certain embodiments, additional frames can be created that represent the other attributes. For example, if another set of frames are generated, such as reflectance frames (not shown) then the corresponding reflectance frame indicates the level of reflectance of each corresponding point within a corresponding geometry frame 420 and a corresponding texture frame 422.

The frame packing 416 sorts and packs the patches (both the geometry and texture patches) into respective frames, such as the geometry frames 420 and the texture frames 422. In addition to sorting and packing patches of a similar attribute into similar frames, the frame packing 416 packs patches from the similar layers into the same frame. For example, for any given frame, the frame can include patches that represent one same attribute of the point cloud 412, which are from the same depth. For instance, each of the geometry frames 420 includes patches of points that represent the geometry of the 3D point cloud 412 from a single layer, whereas each of the texture frames 422 include patches of points that represent the texture of the 3D point cloud 412 from a single layer. In certain embodiments, frame packing 416 generates one or more occupancy map frames 424 based on the placement of the patches within the geometry frames 420 and the texture frames 422.

For example, a first frame from a first depth is denoted as $D_0(r,c)$ and the second frame from the second depth is denoted as $D_1(r,c)$, where 'r' and 'c' denote the row and column index, respectively. Additionally, 'r' and 'c' can range from zero to the number of rows or columns in the depth image, respectively. The depth frames $D_0$ and $D_1$ are constrained such that $D_0$ is less than or equal to $D_1$ which is less than or equal to $D_0$ plus the surface thickness, where the surface thickness represents the difference between the depths of the two layers.

In certain embodiments, frame packing 416 generates the occupancy map, denoted as $O(r,c)$, for each frame. A value of zero in the occupancy map at a particular row and column indicates that the corresponding depth values are to be ignored by the decoder 450 when reconstructing the point cloud. In certain embodiments, the encoder 410 can assign any depth values for pixels associated with a zero in the occupancy map, in order to minimize the bit-rate. A non-zero value, such as one, in the occupancy map at a particular row and column indicates that the corresponding depth values are valid and to be used by the decoder 450 when reconstructing the point cloud.

The interleaving engine 418 generates a single frame from two or more frames of the same attribute. In certain embodiments, the interleaving engine 418 selects one pixel from one frame and one pixel from another frame to generate a new frame that includes a portion of the pixels from each of the frames. When generating the new frame, the interleaving engine 418 alternates selecting pixels from each of the exiting frames across each row and each column.

For example, if two layers are indicated by the encoder 410, then a frame at a first depth is denoted as $D_0$ and a frame at a second depth is denoted as $D_1$, then the new frame is denoted as $D_2$. FIG. 5, below illustrates an example of generating an interleaved frame, $D_2$, from two frames, $D_0$ and $D_1$ representing two different layers. That is, the interleaved frame $D_2$ represents a frame that includes pixels from both frame $D_0$ and frame $D_1$. Since the interleaved frame $D_2$ is formed using both frames $D_0$ and $D_1$, both frames $D_0$ and $D_1$ are dilated. It should be noted that the interleaved frame $D_2$ can represent frames of any attribute (such as geometry, and texture). In another example, if three layers are indicated by the encoder 410, then a frame at a first depth is denoted as $D_0$, a frame at a second depth is denoted as $D_1$, and a frame at a third depth is denoted as $D_2$, then the new frame is denoted as $D_3$. It should be noted that the depth frame $D_3$ can represent frames of any attribute.

Generating the interleaved frame $D_2$, when $D_2$ represents geometry frames 420, can be based on Syntax (1) below. For example, based on the height and width of the geometry frames 420 (from different layers) the interleaving engine 418 selects alternating pixels of each frame.

```
Syntax                                              (1)
    for (x = 0; x < imageWidth; ++x)
    {
        for (y = 0; y < imageHeight; ++y)
        {
            if ((x + y) % 2 == 0))          //(x + y) is even
                D2[x][y] = D0[x][y];
            else                             //(x + y) is odd
                D2[x][y] = D1[x][y] ;
        }
    }
```

Syntax (1) describes that for a given pixel in the $D_0$ frame and for a given pixel in the $D_1$ frame, the coordinates of the pixel indicate whether that pixel is included in the interleaved frame $D_2$. For example, each pixel can have a coordinate indicating a location within the frame identified by the column and the row. If the pixel is in the first column and the first row (such as the top row and the left most column), then the coordinates of that pixel can be denoted as (0,0). Similarly, the pixel at location (0,1) could represent the pixel to the right of the first pixel at (0,0). FIG. 6A illustrates example coordinates associated with each pixel.

Syntax (1) indicates that the pixels selected from frames ($D_0$ or $D_1$) based on whether the coordinates of a pixel when added together is even or odd. Points are selected from the frame $D_0$, when the summed coordinate is even, while points are selected from the frame $D_1$ when the summed coordinate is odd. Alternatively, in certain embodiments, points are selected from the frame $D_0$, when the summed coordinate is odd, while points are selected from the frame $D_1$ when the summed coordinate is even. The location of each pixel selected from frames $D_0$ or $D_1$ is positioned in the same coordinate location in interleaved frame $D_2$. For example, if the pixel at location (0,0) from frame $D_0$, is selected, then that pixel is placed at the location (0,0) in the interleaved frame $D_2$. Similarly, if the pixel at location (0,0) from frame $D_1$ is selected, then that pixel is placed at the location (0,0) in the interleaved frame $D_2$. The process continues until the interleaved frame $D_2$ is full of pixels from the frames $D_0$ and $D_1$. Equation (1) below describes Syntax (1), such that selecting pixels from the frames $D_0$ or $D_1$ are based on whether the coordinates of a pixel when added together is even or odd. Generating the interleaved frame $D_2$ frame is illustrated in FIG. 5.

$$D_2(r, c) = \begin{cases} D_0(r, c) \text{ for } (r+c) \text{ is even} \\ D_1(r, c) \text{ for } (r+c) \text{ is odd} \end{cases} \quad (1)$$

In certain embodiments, the process of generating the interleaved frame is the same for both geometry frames and color frames (as well as any other attribute or texture). In other embodiments, Syntax (1) illustrates the process of generating an interleaved frame representing geometry while Syntax (2) below, illustrates the process of generating an interleaved frame representing color.

```
Syntax                                                    (2)
  for (x = 0; x < imageWidth; ++x)
  {
    for (y = 0; y < imageHeight; ++c)
    {
      if ((x + y) % 2 == 0)):       //(x + y) is even
      {
        for (c = 0; c < 3; ++c)
          C2[x][y][c] = C0[x][y][c];
      }
      else                          //(x + y) is odd
      {
        for (c = 0; c < 3; ++c)
          C2[x][y][c] = C1[x][y][c];
      }
    }
  }
```

Syntax (2) describes that for a given pixel in the $C_0$ frame (similar to the $D_0$ frame but representing a texture) and for a given pixel in the $C_1$ frame similar to the $D_1$ frame but representing a texture), the coordinates of the pixel indicate whether that pixel is included in the interleaved texture frame $C_2$. $C_0$ represents a color frame that includes color values from the near layer, while $C_1$ represents a color frame that includes color values from the far layer. Similar to Syntax (1), the interleaved texture frame $C_2$ is generated by taking alternate color values from across all rows and all columns from the frames $C_0$ and $C_1$. Generating the interleaved texture frame $C_2$ frame is illustrated in FIG. 5.

In certain embodiments, prior to creating interleaved texture frame $C_2$ the encoder 410 reconstructs the point cloud using the using the interleaved geometry frame, such as the frame $D_2$, via Syntax (1). Reconstructing the point cloud includes interpolating the missed points from the interleaved frame $D_2$, by recreating the frames $D_0$ and $D_1$, which is described in greater detail with respect to the decoder 450 and FIGS. 4C, 6A, and 6B, below. The colors or textures that are used in the frames $C_1$ and $C_2$ are then associated with the reconstructed point cloud, as one or more points in the reconstructed point cloud could shift due to the generation of the interleaved frame $D_2$, the compression of the frames, and the reconstruction of the frames. By applying the color to the reconstructed point cloud can reduce any misplaced color points.

The geometry frames 420 represent the interleaved frames $D_2$. That is, the geometry frames 420 include points from two or more geometry frames of different depths. The texture frames represent the interleaved texture frame $C_2$. That is, the texture frames 422 include points from two or more color frames of different depths, similar to that of the interleaved texture frame $C_2$. A single geometry frame 420 corresponds to a single texture frame 422.

The occupancy map frames 424 represent occupancy maps that indicate the valid pixel locations in the frames (such as the geometry frames 420 and the texture frames 422). The valid pixels are the actual points of the 3D point cloud 412 which are projected into patches (via the patch generator 414) and packed into respective frames (via the frame packing 416). For example, the occupancy map frames 424 indicate whether a point in a frame is a valid pixel or an invalid pixel. A valid point on the occupancy map indicates a pixel on the 2D frame that corresponds to a 3D point in the point cloud. Conversely, an invalid point on the occupancy map indicates an invalid pixel on the 2D frame. An invalid pixel does not correspond to a point of the 3D point cloud 412. In certain embodiments, one of the occupancy map frames 424 correspond to both a geometry frame 420 and a texture frames 422.

In certain embodiments, the geometry frames 420 and the texture frames 422 can each represent groupings of projections of the 3D point cloud 412. For example, a projection of the 3D point cloud 412 can be made at different depths, such as the frames $D_0$ and $D_1$. For instance, two or more geometry frames can include projections at different depths. Regardless of the number of depth images that are generated for an input point cloud frame, each image is separated from the previous frame or a subsequent frame by a layer where the surface thickness limits the maximum difference between consecutive layer depth values.

The geometry frames 420, the texture frames 422, and the occupancy map frames 424 are encoded via the encoding engine 426. In certain embodiments, the frames (such as the geometry frames 420, the texture frames 422, and the occupancy map frames 424) are encoded by independent encoders. For example, one encoding engine can encode the geometry frames 420, another encoding engine can encode the texture frames 422, and yet another encoding engine can encode the occupancy map frames 424. In certain embodiments, the encoding engine 426 can be configured to support an 8-bit, a 10-bit, a 12-bit, a 14-bit, or a 16-bit, precision of data. The encoding engine 426 can be a video or image codec such as HEVC, AVC, VP9, VP8, JVNET, and the like to compress the 2D frames representing the 3D point cloud.

In certain embodiments, when there are more than two layers the interleaving that is performed by the encoder is dependent on whether the number of layers is even or odd. For example, if the number of layers is even, then the interleaving engine 418 groups the layers into pairs. For instance, in a scenario with four layers—a first pair includes $D_0$ and $D_1$ while a second pair includes $D_2$ and $D_3$. Alternatively, if the number of layers is odd, then the interleaving engine 418 groups the layers into pairs and one layer will remain ungrouped. The layers that are grouped and interleaved are then compressed by the encoding engines 426. The layer that is ungrouped can be compressed by the encoding engines 426 without being interleaved.

The multiplexer 428 combines the multiple frames (such as the geometry frames 420, the texture frames 422, and the occupancy map frames 424) which are encoded, to create a bitstream 430. The multiplexer 428 is also able to combine the other information that instructs the decoder 450 as to how to perform interpolate and generate the multiple frames from a single interleaved frame. In certain embodiments, the surface thickness is signaled in the bitstream 432, such that the decoder 450 can identify the surface thickness parameter used by the encoder 410. In certain embodiments, the surface thickness is predetermined such that both the encoder 410 and the decoder 450 know the surface thickness, such that the encoder 410 does not include a surface thickness parameter in the bitstream 432. The decoder 450 uses the surface thickness as used in the encoder 410 for clipping during interpolation.

In certain embodiments, the encoding engines 426 can encode the frame $D_1(r,c)$ directly. When the encoding engines 426 encodes the frame $D_1(r,c)$ directly a command line parameter can be set to "absoluteD1=1." In certain embodiments, the encoding engines 426 can encode the frame $D_1(r,c)$ indirectly. When the encoding engines 426 encodes the frame $D_1(r,c)$ indirectly a command line parameter can be set to "absoluteD1=0." To encode the frame $D_1(r,c)$ indirectly, the encoding engines 426 use the reconstructed values for the frame $D_0(r,c)$ denoted as $\hat{D}_0(r, c)$ as used as a prediction for the frame $D_1(r,c)$. For example, instead of encoding the frame $D_1(r,c)$ directly, the encoding engine 426 encodes the difference between the frame $D_1(r,c)$ and the frame $\hat{D}_0(r, c)$, denoted as delta_$D_1$, as shown in Equation (2)

$$\text{delta\_}D_1 = D_1(r,c) - \hat{D}_0(r,c) \quad (2)$$

In certain embodiments, the encoding engine 426 can encode the interpolation of the frame $D_1(r,c)$ values from the frame $\hat{D}_0(r, c)$. For example, interpolated frame $D_1(r,c)$, denoted as $D_1^i(r, c)$, can be derived from Syntax (3) below.

```
Syntax                                              (3)
{
    Let D0 = D̂₀ (r, c)
    Set Dmax = 0
    For each neighboring position (u, v) of p in 3 × 3
    window around (r, c)
    {
        Set D1 = D̂₀ (u, v)
        If D1 > Dmax and (D1-D0) <= SurfaceThickness
            Set Dmax = D1
    }
    Set D₁ⁱ(r, c) = max(0, Dmax-1)
}
```

Syntax (3) describes that for each occupied point 'p' at location (r,c) in the frame $D_0$, a corresponding point in the occupancy map at the location (r,c) is one. Further, only the frame $\hat{D}_0(r, c)$ values within a three-by-three neighborhood are used for which the occupancy map value is one, and which belong to the same patch as the point at position (r,c). In certain embodiments, the maximum value in the three-by-three neighborhood is used to derive the interpolated value. In other embodiments, other criteria can used to derive the interpolated value. For example, a mean or median of the $D_0$ values, in the three-by-three neighborhood, can be used to derive the interpolated value.

After deriving the interpolated value $D_1^i(r, c)$, which is used as a prediction for $D_1(r, c)$, such that the value of Equation (3) is encoded, via the encoding engine 426, as the frame $D_1$.

$$D_1(r,c) - D_1^i(r,c) + \text{offset} \quad (3)$$

As expressed in Equation (3), an offset is added to the prediction error as the prediction error can be positive or negative. For example, the offset may be 128 for 8-bit depth images. $D_1^i(r, c)$ is a more accurate prediction of $D_1(r, c)$ compared with $\hat{D}_0(r, c)$. As a result, the prediction error is reduced and the resulting delta_$D_1$ can be coded with increased rate-distortion performance. Additionally, the difference for uncopied points (a point which has a zero value in the occupancy map) can also be set to the offset value.

In certain embodiment, when decoded, the decoder (such as decoder 450 of FIG. 4C) can generate the frame $\hat{D}_0(r, c)$. The decoder can then use the frame $\hat{D}_0(r, c)$ to produce interpolated value $D_1^i(r, c)$. Thereafter, the reconstructed frame $D_1$ less the offset can be added to the interpolated value $D_1^i(r, c)$ to produce the reconstructed frame $\hat{D}_1(r, c)$.

In certain embodiments, instead of adding an offset, as depicted in Equation (3), other strategies can be implemented. For example, a mapping can be implemented (instead of the offset) since the prediction error can be negative. A mapping, as shown in Equation (4) interleaves positive and negative values. As described in Equation (4), the value of y is always a non-negative value. As such, a mapped prediction error can be sent to the video codec.

$$y = \begin{cases} o & \text{for } x = 0 \\ -2x & \text{for } x < 0 \\ 2x - 1 & \text{for } x > 0 \end{cases} \quad (4)$$

As described above, with respect to the interleaving engine 418 and Equation (1), the interleaving engine 418 creates a single depth image, such as the interleaved frame $D_2(r,c)$ by interleaving points from the frames $D_0$ and $D_1$ In certain embodiments, interleaving engine 418 can also create another depth image, denoted as frame $D_3$. The frame $D_3$ can include the points that were discarded when the interleaving engine 418 created the interleaved frame $D_2$. Equation (5) describes using the points from the frames $D_0$ or $D_1$ that were not included in the interleaved frame $D_2$.

$$D_3(r, c) = \begin{cases} D_0(r, c) & \text{for } (r + c) \text{ is odd} \\ D_1(r, c) & \text{for } (r + c) \text{ is even} \end{cases} \quad (5)$$

As discussed above, Equation (1) places points from the frame $D_0$ into the interleaved frame $D_2$ that the coordinates when added together are even, and points from the frame $D_1$ are placed into the interleaved frame $D_2$ that the coordinates when added together are odd. In contrast, Equation (5) places points from the frame $D_0$ into the frame $D_3$ when the coordinates are added together yield an odd value and points from the frame $D_1$ are placed into the frame $D_3$ when the coordinates are added together yield an even value. After the frames $D_2$ and $D_3$ are created, the frame $D_2$ is coded using a video codec. Thereafter, the encoder 410 can decode the interleaved frame $D_2$, denoted as $\hat{D}_2(r, c)$. Using the decoded interleaved frame $\hat{D}_2(r, c)$, an interpolated version of $D_3(r,c)$ is derived and denoted as $D_3^i(r, c)$. After deriving the interpolated value, $D_3(r, c)$, which is used as a prediction for the frame $D_3(r, c)$, such that the value of Equation (6) is encoded, via the encoding engine 426, as the depth image $D_3$.

$$D_3(r,c) - D_3^i(r,c) + \text{offset} \quad (6)$$

The decoder, such as the decoder 450, of FIG. 4A, generates the decoded interleaved frame $\hat{D}_2(r, c)$. After generating the decoded interleaved frame $\widehat{D_2}(r, c)$, the decoder 450, can use the decoded interleaved frame $\widehat{D_2}(r, c)$ to derive $D_3^i(r, c)$. To generate the reconstructed depth image $\widehat{D_3}(r, c)$, the decoder 450 subtracts the offset from the reconstructed depth image, $D_1$, which is added to the $D_3^i(r, c)$. Thereafter, the frames $\widehat{D_0}(r, c)$ and $\widehat{D_1}(r, c)$ are produced using Equations (7) and (8), below.

$$\widetilde{D_0}(r, c) = \begin{cases} \widetilde{D_2}(r, c) \text{ for } (r+c) \text{ is Even} \\ \widetilde{D_3}(r, c) \text{ for } (r+c) \text{ is Odd} \end{cases} \quad (7)$$

$$\widetilde{D_1}(r, c) = \begin{cases} \widetilde{D_3}(r, c) \text{ for } (r+c) \text{ is Even} \\ \widetilde{D_2}(r, c) \text{ for } (r+c) \text{ is Odd} \end{cases} \quad (8)$$

In certain embodiments, similar interpolation as a predictor can be applied to texture frames as well as depth frames, as shown above. For example, a first texture frame $C_0(r,c)$ and a second texture frame $C_1(r,c)$, can be used to create frames $C_2(r,c)$ and $C_3(r,c)$. Initially $C_2(r,c)$ is coded using a video codec (such as HEVC, AVC, AV-I, and the like). Thereafter the reconstructed frame $C_2(r,c)$ is used to create and interpolate $C_3(r,c)$. The difference between $C_3(r,c)$ and its interpolated version after adding an offset or mapping is then coded using a video codec.

FIG. 4C illustrates the decoder 450 that includes a demultiplexer 452, one or more decoding engines 460, an interpolating engine 462, and a reconstruction engine 464. The decoder 450 receives a bitstream 430, such as the bitstream that was generated by the encoder 410. The demultiplexer 452 separates bitstream 430 into one or more bitstreams representing the different frames. For example, the demultiplexer 452 separates various streams of data such as the geometry frame information 454 (originally the geometry frames 420 of FIG. 4B), texture frame information 456 (originally the texture frames 422 of FIG. 4B), and the occupancy map information 458 (originally the occupancy map frames 424 of FIG. 4B).

The decoding engines 460 decode the geometry frame information 454, the texture frame information 456, and the occupancy map information 458. In certain embodiments, a single decoding engine 460 decodes the geometry frame information 454, the texture frame information 456, and the occupancy map information 458. After decoding the geometry frame information 454, the texture frame information 456, and the occupancy map information 458, multiple video frames representing the geometry and texture of the 3D point cloud as well as the and occupancy map frames are represented. For example, a single geometry frame includes points from different layers of a 3D point cloud. Similarly, a single texture frame includes points from different layers of the 3D point cloud. The interleaved frame 590 of FIG. 5B illustrates an example geometry frame or an example texture frame that include points representing the 3D point cloud from different depths. In certain embodiments, separate, parallel decoding engines similar to the decoding engine 460, can process the information contained within the bitstream 430.

The interpolating engine 462 derives the set of missing geometry values from the points in a geometry frame (from the decoded geometry frame information 454) and derives the set of missing texture values from the points in the texture frame (from the decoded the texture frame information 456). In certain embodiments, after derives the set of missing geometry values, the interpolating engine 462 generates a first set of frames representing the geometry components of the 3D point cloud. The first set of frames is based on the geometry frame (from the decoded geometry frame information 454) and the missing geometry values that were previously derived. Similarly, after derives the set of missing texture values, the interpolating engine 462 generates a second set of frames representing the texture components of the 3D point cloud. The second set of frames is based on the texture frame (from the decoded texture frame information 456) and the missing texture values that were previously derived. If multiple textures were encoded by the encoder 410, then the interpolating engine 462 can generates additional sets of frames for each additional texture.

The reconstruction engine 464 generates a reconstructed point cloud 466 by reconstructing the decoded geometry frame information 454, the decoded texture frame information 456, and the decoded occupancy map information 458. The reconstructed point cloud 466 is similar to the 3D point cloud 412.

Generally, reconstructing the point cloud is a multi-step process. The interpolating engine 462 interpolates and derives values for the missing geometry points. The reconstruction engine 464 reconstructs the geometry of the 3D point cloud. Thereafter, the interpolating engine 462 interpolates and derives values for the missing texture (or color) points and then the reconstruction engine 464 applies the texture to the reconstructed geometry points based on the interpolated missing texture values and the texture pixels received in the decoded 450 from the texture frame information 456.

When the reconstruction engine 464 reconstructs the geometry to generate the point cloud, only an interleaved depth frame representing geometry is available (such as the frame 690 of FIGS. 6A and 6B). The reconstruction engine 464 uses the multiple frames corresponding to different depth (such as layers) to generate the reconstructed point cloud 466. Therefore, the interpolating engine 462 derives the missing depth values based on interpolation of the neighboring pixels that belong to the same patch.

The interpolating engine 462 derives each missing value from the neighboring pixels that are included in the geometry frame. For example, two depths were used by the encoder to generate the geometry frame (the interleaved frame $D_2$), for any given point within the interleaved frame $D_2$ if the point is from the frame $D_0$, then a corresponding point from the frame $D_1$ is missing, and therefore needs to be derived from the interpolation engine 462. Similarly, for any given point within the interleaved frame $D_2$ if the point is from the frame $D_1$, then a corresponding point from the frame $D_0$ is missing, and therefore needs to be derived from the interpolation engine 462. That is, for each point that is included in the interleaved frame $D_2$ the point originated from either the frame $D_0$ or the frame $D_1$, and the corresponding point from the other frame is missing. For example, to derive a value for a missing $D_1$ pixel, the interpolation engine 462 uses the neighboring pixels in the decoded geometry frame corresponding to the depth $D_1$ depth. Similarly, to derive a value for a missing $D_0$ pixel, the interpolation engine 462 uses the neighboring pixels in the decoded geometry frame corresponding to the depth $D_0$ depth. The predicted value of $D_0$ is denoted as $\widehat{D0}$. Similarly, The predicted value of $D_1$ is denoted as $\widehat{D1}$.

Equations (9) and (10) describe the derivation of the missing depth values from a geometry frame. For example, Equation (9) describes that for a pixel at location (r,c) in the interleaved frame that stores the value of $D_0$, the interpolation engine 462 derives ($\widehat{D_1}$) which is based on a function of the four neighboring pixels of the point $D_0$. Similarly, Equation (10) describes that for a pixel at location (r,c) in the interleaved frame that stores the value of $D_1$, the interpolation engine 462 derives ($\widehat{D_0}$) which is based on a function of the four neighboring pixels of the point $D_0$.

$$\widehat{D_0}_{(x,y)}=\text{func}(D_0(x,y-1),D_0(x-1,y),D_0(x,y+1),D_0(x+1,y)) \quad (9)$$

$$\widehat{D_1}_{(x,y)}=\text{func}(D_1(x,y-1),D_1(x-1,y),D_1(x,y+1),D_1(x+1,y)) \quad (10)$$

Equations (9) and (10) above the term 'func' can represent a maximum value of each of the points, a minim value of each point, an average value of each of the points or the like. Additionally, Equations (9) and (10) can include the surface thickness separating the two depths.

For example, if the point at location (1,1) in the interleaved frame $D_2$ is from the frame $D_0$, then the point from the frame $D_1$ at location (1,1) is missing. Equation (11) below describes the interpolating engine 462 deriving the $\widehat{D_1}$ at the location (1,1).

$$\widehat{D_1}(1,1)=\max(\min(\text{mean}(D_1(1,0),D_1(0,1),D_1(1,2),D_1(2,1)),D_0(1,1)+\text{Surface Thickness}),D_0(1,1)) \quad (11)$$

Similarly, if the point at location (1,2) in the interleaved frame $D_2$ is from the $D_1$ frame, then the point from the frame $D_0$ at location (1,2) is missing. Equation (12) below describes the interpolating engine 462 deriving the $\widehat{D_0}$ at the location (1,2).

$$\widehat{D_0}(1,2)=\max(\min(\text{mean}(D_0(1,1),D_0(0,2),D_0(1,3),D_0(2,2)),D_1(1,2)-\text{Surface Thickness}),D_1(1,2)) \quad (12)$$

When deriving a missing $D_0$ and a missing $D_1$ value, the interpolation engine 462 can generate sets of frames that include points from each depth. For example, if the decoded geometry frame includes values from two depths, then two geometry frames are generated. A first geometry frame will include values from the depth $D_0$ and a second geometry frame will include values from the depth $D_1$. As the missing values are derived, the missing values are filled into respective locations into each frame. FIGS. 6A and 6B below illustrate the generating a set of frames (representing geometry, color, or any other attribute) from the different depths based on the received geometry frame and the derived missing values.

In certain embodiments, the interpolation engine 462 derives a missing $D_1$ value or the missing $D_0$ value, when neighboring pixels of missing pixel are identified as valid via the decoded occupancy map information 458. For example, a pixel is identified as valid if it has a value of one at the same location in the corresponding occupancy map frame. A pixel is identified as invalid if it has a value of zero at the same location in the corresponding occupancy map frame.

In certain embodiments, the interpolation engine 462 derives a missing value, from neighboring pixels that belong to the same patch as the pixel whose value is derived by the interpolation engine 462. For example, with respect to received frame 690 of FIG. 6A, the pixel 608 corresponds to a point at depth $D_0$ at a location identified by row 1 and column 1 (1,1). Since pixel 608 corresponds to the depth $D_0$, the interpolation engine 462 determines that a pixel at the depth $D_1$ also at the location (1,1) is missing. The interpolation engine 462 determines whether the neighboring pixels at depth $D_1$ belong to the same patch as the missing pixel at location (1,1). For example, the interpolation engine 462 inspects the patch identifier associated with the neighboring pixels 652, 657, 659, and 664 to determine whether the patch that corresponds to the missing pixel belongs to the same patch as one or more of the neighboring pixels. When deriving the value of the missing pixel, the interpolation engine 462, uses only the neighboring pixels that belong to the same patch as the missing pixel.

In certain embodiments, the interpolation engine 462 derives a missing $D_1$ value by finding the average of the neighboring values at the $D_1$ depth and derives a missing $D_0$ value by finding the minimum value of the neighboring values at the $D_0$ depth.

For example, referring to FIG. 6A, pixel 608 corresponds to a point at the frame $D_0$ at a location identified by row 1 and column 1 (1,1). Since pixel 608 corresponds to a point from the frame $D_0$, the interpolation engine 462 determines that a pixel form the frame $D_1$ at the location (1,1) is missing. Therefore, to derive the value of the pixel from the frame $D_1$ at (1,1), the interpolation engine 462 derives the average value of the pixels that neighbor (1,1), which are from the frame $D_1$, such as pixel 652, pixel 657, pixel 659, and pixel 664.

Similarly, since pixel 659 corresponds to a point from the frame $D_1$ at a location identified by row 1 and column 2 (1,2). Since the pixel 659 corresponds to the frame $D_1$, the interpolation engine 462 determines that a pixel from the frame $D_0$ at the location (1,2) is missing. Therefore to derive the value of the pixel $D_0$ at (1,2), the interpolation engine 462 identifies the minimum value of the pixels that neighbor (1,2) from the frame $D_0$, such as pixel 603, pixel, 608, pixel 610, and pixel 615.

In certain embodiments, the interpolation engine 462 inspects the interleaved frame $D_2$, and derives a missing point that is identified to be from the frame $D_1$ by finding the average of the neighboring values from the frame $D_1$ and derives a missing point that is identified to be from the frame $D_0$ by finding the maximum value of the neighboring values from the frame $D_0$.

For example, referring to FIG. 6A, pixel 608 corresponds to a point at from the frame $D_0$ at a location identified by row 1 and column 1 (1,1). Since pixel 608 corresponds to the frame $D_0$, the interpolation engine 462 determines that a pixel from the frame $D_1$ also at the location (1,1) is missing. Therefore, to derive the value of the pixel from the frame $D_1$ at (1,1), the interpolation engine 462 derives the average value from the neighboring pixels at (1,1) from the frame $D_1$, such as pixel 652, pixel, 657, pixel 659, and pixel 664, which are included in the frame received frame 690.

Similarly, since pixel 659 corresponds to a point from the frame $D_1$ at a location identified by row 1 and column 2 (1,2). Since pixel 659 corresponds to the frame $D_1$, the interpolation engine 462 determines that a pixel from the frame $D_0$ at the location (1,2) is missing. Therefore to derive the value of the pixel from the frame $D_0$ at (1,2), the interpolation engine 462 identifies the maximum value from the neighboring pixels at (1,2) from the frame $D_0$, such as pixel 603, pixel, 608, pixel 610, and pixel 615, which are included in the frame received frame 690.

In certain embodiments, the interpolation engine 462 derives a missing values from the frame $D_1$ by finding the average of the neighboring values that are included in the received interleaved from $D_2$ and derives a missing $D_0$ value by adaptively identifying the minimum value of the neighboring $D_0$ values, the maximum value of the neighboring $D_0$ values or the average of the neighboring $D_0$ values. Six direction mode projects points onto six directions rather than three directions. When the six direction mode is activated the interpolation engine 462 derives a missing $D_1$ value by finding the average of the neighboring values from the frame $D_1$. Similarly, to derive a missing $D_0$ value, the interpolation engine 462 determines if the projection mode is set to zero or one, when the six direction mode is activated. A projection mode set to zero indicates that the projection of the patch is one of the first three directions, while a projection mode set to one indicates that the projection of the patch is one of the last three directions. Therefore, when the six direction mode is activated and the projection mode is set to zero, then the interpolation engine 462 derives a value for a missing $D_0$ pixel (from the interleaved frame $D_2$) by identifying the minimum value of the neighboring pixels from the frame $D_0$. When the six direction mode is activated and the projection mode is set to one, then the interpolation engine 462 derives a value for a missing $D_0$ pixel (from the interleaved frame $D_2$) by identifying the maximum value of the neighboring pixels that are from the frame $D_1$.

In certain embodiments, the interpolation engine 462 applies an additional condition to ensure that the difference in depth between a pixel in the frame $D_0$ and a corresponding pixel in the frame $D_1$ does not exceed the surface thickness parameter as indicated by the encoder. For example, if the value of the derived pixel exceeds the existing pixel, at the same location, plus the surface thickness parameter, then the interpolation engine 462 assigns the derived pixel the value of corresponding pixel plus the surface thickness parameter. Similarly, if the value of the derived pixel is less than the existing pixel (at the same location) minus the surface thickness parameter, then the interpolation engine 462 assigns the derived pixel as the value of the known pixel less the surface thickness parameter.

Syntax (4) below describes reconstructing a point cloud using the interleaved depth frame, by deriving the missing values and includes an additional condition to ensure that the $D_0$ values do not exceed the $D_1$ value at each pixel location.

Syntax (4)
```
//occupancyMap stores the occupancy information (1 means point is occupied, 0 means
unoccupied)
//blockToPatch stores the number of the patch a point belongs to
//Carry out this logic for all patches and all points inside each patch
if ((x + y) % 2 ==1) {
   D1[x][y] = D2[x][y]; //D2 is the interleaved depth frame
   double minDepth = D2[x][y];
   if ((x > 0) && (occupancyMap[x - 1][y] == 1) && (blockToPatch[x - 1][y] ==
blockToPatch[x][y]))
   {
      if(D2[x - 1][y] < minDepth)
         minDepth = D2[x - 1][y];
   }
   if ((x < (imageWidth - 1)) && (occupancyMap[x - 1][y] == 1) &&
(blockToPatch[x + 1][y] == blockToPatch[x][y]))
   {
      if(D2[x - 1][y] < minDepth)
         minDepth = D2[x - 1][y];
   }
   if ((y > 0) && (occupancyMap[x][y -1] ==1) && (blockToPatch[x][y -1] ==
blockToPatch[x][y]))
   {
      if(D2[x][y - 1] < minDepth)
         minDepth =D2[x][y - 1];
   }
   if ((y < (imageHeight - 1)) && (occupancyMap[x][y + 1] ==1) &&
(blockToPatch[x][y + 1] == blockToPatch[x][y]))
   {
      if(D2[x][y + 1] < minDepth)
         minDepth = D2[x][y + 1];
   }
   D0[x][y] = round(min(max(minDepth, D1[x][y] - 4), D1[x][y])); // the min condition
ensures that the predicted D0[x][y] does not go over the value of D1[x][y]
}
else { // that is (x + y) is even
   D0[x][y] =D2[x][y];
   double DepthNeighbors[4] = [0];
   int count = 0;
   if ((x > 0) && (occupancyMap[x - 1][y] ==1) && (blockToPatch[x - 1][y] ==
blockToPatch[x][y]))
   {
      DepthNeighbors[0] = D2[x - 1][y];
      count++;
   }
   if ((x < (imageWidth - 1)) && (occupancyMap[x + 1][y] == 1) &&
(blockToPatch[x + 1][y] == blockToPatch[x][y]))
   {
      DepthNeighbors[1] = D2[x + 1][y];
      count++;
   }
   if ((y > 0) && (occupancyMap[x][y - 1] ==1) && (blockToPatch[x][y - 1] ==
blockToPatch[x][y]))
   {
      DepthNeighbors[2] = D2[x][y - 1];
      count++;
   }
```

```
    if ((y < (imageHeight - 1)) && (occupancyMap[x][y + 1] == 1) &&
(blockToPatch[x][y + 1] == blockToPatch[x][y]))
    {
       DepthNeighbors[3]= D2[x][y + 1];
       Count++;
    }
    D1[x][y] = round(max(min(((DepthNeighbors[0] + DepthNeighbors[1] +
DepthNeighbors[2] +
        DepthNeighbors[3]) / count), D0[x][y] + 4), D0[x][y])); // the max
condition ensures that the predicted D1[x][y] does not go below the value of D0[x][y]
  }
```

After the reconstruction engine 464 reconstructs the geometry of the point cloud, the point cloud is colored. To color the point cloud, the reconstruction engine 464 uses the set of texture frames, where each frame corresponds to a different layer. The interpolating engine 462 derives the missing values and generates the set of texture frames from the interleaved texture frame that is received from the encoder 410.

In certain embodiments, the interpolating engine 462 derives the value of a missing texture pixel based on whether the value of a pixel from the geometry frame $D_0$ and the value of a pixel from the geometry frame $D_1$, where the pixel location within the geometry frames $D_0$ $D_1$ are at the same location as the missing texture pixel. Equation (13) and Equation (14) below describe the interpolating engine 462 deriving a missing texture pixel.

$$\text{if } D_0(1, 1) \neq D_1(1, 1) \quad (13)$$
$$\widehat{C_1}(1, 1) = \text{mean}(C_1(1, 0), C_1(0, 1), C_1(1, 2), C_1(2, 1))$$
$$\text{else}$$
$$\widehat{C_1}(1, 1) = C_0(1, 1)$$

$$\text{if } D_0(1, 2) \neq D_1(1, 2) \quad (14)$$
$$\widehat{C_o}(1, 2) = \text{mean}(C_0(1, 1), C_0(0, 2), C_0(1, 3), C_0(2, 2))$$
$$\text{else}$$
$$\widehat{C_o}(1, 2) = C_1(1, 2)$$

Equation (13) describes the interpolating engine 462 deriving the value of a missing texture pixel $C_1$. If the value of the pixel from the geometry frame $D_0$ at location (1,1) does not match the value of the pixel from the geometry frame $D_1$ at location (1,1), where pixel from frames $D_0$ and pixel $D_1$ are at different depths (or layers), then the value for the missing texture pixel at location (1,1) is the mean or average of the neighboring pixels at the same depth. If the value of the pixel from the geometry frame $D_0$ at location (1,1) matches the value of the pixel the geometry frame $D_1$ at location (1,1), where pixel from frames $D_0$ and pixel $D_1$ are at different depths, then the value for the missing texture pixel at location (1,1) is the value of the texture pixel that is located in the received interleaved texture frame. For example, when the value of a pixel of the geometry frames $D_0$ and $D_1$ at location (1,1) match, then the interpolating engine 462 assigns the texture of the missing texture pixel as the texture of the texture pixel that is present in the interleaved texture frame. As indicated in Equation (14), the interpolating engine 462 derives a value the missing texture pixel at depth $C_0$ similar to deriving a value of a missing texture pixel at depth $C_1$ as described in Equation (13).

Similar to the geometry frames, explained above, the interpolation engine 462 derives a missing texture value from neighboring pixels that belong to the same patch as the pixel whose value is derived by the interpolation engine 462. Any neighboring pixel that does not belong to the same patch as the missing pixel, then that that pixel is not considered by the interpolation engine 462 when deriving the texture value of the missing pixel.

In certain embodiments, the interpolation engine 462 assigns the color value of a missing color pixel as the color value of the nearest point of the reconstructed point cloud. For example, the reconstruction engine 464 reconstructs the geometry while generating the reconstructed point cloud 466. Then the reconstruction engine 464 colors all of the points included in the received interleaved color frame. Since the interleaved color frame includes pixels from multiple depths, only a portion of the geometry points are colored as the remaining color values are missing. For each point of the reconstructed point cloud 466 that is not colored, the closest colored point to a non-colored point is identified, and the color value of the closest colored point is assigned to the non-colored point.

Syntax (5) describes the process of coloring a point cloud.

```
Syntax                                                                                      (5)
    // f represents the layer to which the point belongs. f = 0 means the point belongs to the
    near layer, f = 1 means the point belongs to the far layer
    //blockToPatch stores the number of the patch a point belongs to
    // Carry out this logic for all points in the reconstructed point cloud
    if ((f == 0 && (x + y) % 2 == 0) | (f == 1 && (x + y) % 2 ==1)) {
       for (size_t c = 0; c < 3; ++c)
          color[point][c] = C2[x][y][c]; // C2 is the interleaved color frame
    }
    else
    {
       uint32_t tempColor0 = 0;
       uint32_t tempColor1 = 0;
       uint32_t tempColor2 = 0;
       size_t count = 0;
       if ((x > 0) && (blockToPatch[x][y] == blockToPatch[x - 1][y])) {
```

```
        tempColor0 += C2[x - 1][y][0];
        tempColor1 += C2[x - 1][y][1];
        tempColor2 += C2[x - 1][y][2];
        count++;
    }
    if ((x < (imageWidth - 1)) && (blockToPatch[x][y] == blockToPatch[x + 1][y][0])) {
        tempColor0 += C2[x + 1][y][0];
        tempColor1 += C2[x + 1][y][1];
        tempColor2 += C2[x + 1][y][2];
        count++;
    }
    if ((y > 0) && (blockToPatch[x][y] == blockToPatch[x][y - 1])) {
        tempColor0 += C2[x][y - 1][0];
        tempColor1 += C2[x][y - 1][1];
        tempColor2 += C2[x][y - 1][2];
        count++;
    }
    if ((y < (imageHeight - 1)) && (blockToPatch+= C2[x][y] ==
blockToPatch[x][y + 1])) {
        tempColor0 += C2[x][y + 1][0];
        tempColor1 += C2[x][y + 1][1];
        tempColor2 += C2[x][y + 1][2];
        count++;
    }
    color[point][0] = tempColor0 / count;
    color[point][1] = tempColor1 / count;
    color[point][2] = tempColor2 / count;
}
```

After the interpolating engine 462 derived the missing values associated with each missing pixel of the texture frames, the reconstruction engine 464 applies the textures to the geometry of the reconstructed point cloud 466. The reconstructed point cloud 466 should match the 3D point cloud 412 of FIG. 4B.

Although FIG. 4A illustrate the environment-architecture 400, FIG. 4B illustrates the encoder 410, and FIG. 4C illustrates the decoder 450 various changes can be made to FIGS. 4A, 4B, and 4C. For example, any number of encoders or determines can be included environment-architecture 400.

FIG. 5 illustrates frames 500 and 550, which representing different layers of a 3D point cloud and an interleaved frame 590 in accordance with an embodiment of this disclosure. The frames 500 and 550 and the interleaved frame 590 can represent an entire frame or a portion of a larger frame. The frame 500 includes pixels 501-536 and the frame 550 includes pixels 551-586. As shown here, the frames 500 and 550 can represent different layers of a geometry frame or a texture frame. In the example, the frame 500 is similar to the frame $D_0$ while the frame 550 is from the frame $D_1$. In other embodiments, the frame 500 can be similar to any of the frames $D_0$, $D_1$, C0, and $C_1$. Similarly, the frame 550 can be similar to any of the frames $D_0$, $D_1$, C0, and $C_1$. The interleaved frame 590 includes a portion of the pixels from the frames 500 and 550. The interleaved frame 590 can be similar to the interleaved frame $D_2$, the geometry frames 420, the interleaved texture frame $C_2$, and the texture frames 422. The pixels are for illustration only. Other embodiments can be used without departing from the scope of this disclosure.

In this example, the frame 500 represents a frame from the first layer of a point cloud and frame 550 represents a frame from a second layer of the point cloud, such as the point cloud 412 of FIG. 4B. The frames 500 and 550 can be separated by a predefined surface thickness. The frames 500 and 550 and the interleaved frame 590 represent the same attribute. For example, the frames 500 and 550 and the interleaved frame 590 can be geometry of a point cloud. In another example, the frames 500 and 550 and the interleaved frame 590 can be a first texture of the point cloud, such as color. In yet another example, the frames 500 and 550 and the interleaved frame 590 can be another texture of the point cloud, such as reflectance.

The frames 500 and 550 represent frames that are generated by the frame packing 416 of FIG. 4B. The pixels within the frames 500 and 550 can be valid or invalid based on a corresponding occupancy map. The interleaving engine 418 of FIG. 4B interleaves a portion of the pixels from the frame 500 with a portion of the pixels from the frame 550 to generate the interleaved frame 590. The interleaved frame 590 can then be encoded by an encoding engine, such as the encoding engine 426 of FIG. 4B, multiplexed with other frames and transmitted as a bitstream to another device.

The pixels within the frame 500 can be identified by its location within the frame 500, such as a particular row number and a particular column number. Additionally, the pixels within the frame 500 can be associated with a particular patch of the point cloud, via a patch identifier. Similarly, the pixels within the frame 550 can be identified by its location within the frame 550, (by a particular row number and a particular column number) and associated with a particular patch of the point cloud, via a patch identifier.

For example, the pixel 501 and 509 are from the frame 500 which corresponds to a first layer while the pixels 551 and 559 are form the frame 550 which corresponds to the second layer. The pixels 501 and 551 are at location (0,0) of their respective frames, while the pixels 509 and 559 are at location (1,2) of their respective frames. As discussed in Syntax (1) and Equation (1), a pixel from a frame is selected from each respective frame and included in the interleaved frame based on whether the result of adding the column number and the row number is even or odd. For example, the interleaving engine 418 can add the row number and the column number of each point together and when the result is even, the corresponding pixel from frame 500 is included in the interleaved frame 590 and when the result is odd, the corresponding pixel from the frame 550 is included in the interleaved frame 590. Since the location (0,0) is even, the pixel 501, from frame 500, is included in the interleaved frame 590 while the pixel 551 is omitted. Similarly, since the location (1,2) is odd (1+2=3), the pixel 559, from frame 550, is included in the interleaved frame 590, and the pixel 509 is omitted. The interleaving engine 418 performs this process for each pixel to generate the interleaved frame 590. In other embodiments, the interleaving engine 418 includes pixels from the frame 500 in the interleaved frame 590 when the result of adding the row number and the column number is odd and includes pixels from the frame 550 in the interleaved frame 590 when the result of adding the row number and the column number is even. Other methods of including a portion of the pixels from the frame 500 and the frame 550 into the interleaved frame 590 are possible.

Although FIG. 5 illustrates one example method of generating an interleaved frame 590, various changes can be made to FIG. 5. For example, any number of pixels can be included in the frames 500 and 550. In another example, pixels that are included in the interleaved frame 590 from the frame 500 can be odd while the pixels from the frame 550 can be even.

FIGS. 6A and 6B illustrates an example frame 690, an interpolated frame 692, and generated frames 600 and 650 for reconstructing the 3D point cloud in accordance with an embodiment of this disclosure. The frame 690 is similar to the interleaved frame 590 of FIG. 5. The generated frames 600 and 650 for reconstructing the 3D point cloud can be similar to the frames 500 and 550, respectively. The frames 600, 650, 690, and 692 can represent an entire frame or a portion of a larger frame. As shown here, the frames 600, 650, 690, and 692 can represent a geometry frame or a texture frame. The frames 600, 650, 690, and 692 and the pixels 601-636 and 651-686 are for illustration only. Other embodiments can be used without departing from the scope of this disclosure.

The frame 690 can be received from another device, such as encoder (similar to the encoder 410), and represent geometry or texture and includes pixels from multiple layers of the point cloud. As shown in FIG. 6A, the frame 690 includes pixels from two layers of a point cloud. In certain embodiments, if the frame 690 includes points from more than two layers (not shown in FIGS. 6A and 6B), then each additional layer included in the frame 690 will have an additional frame generated, similar to the frames 600 and 650. In this example, the frame 690 is similar to the interleaved frame 590 of FIG. 5. For example, each pixels included in the frame 690 is similar to a respective pixel at a same location (column and row number) in the interleaved frame 590. The frame 690 is a single frame that includes pixels that are interleaved from different layers of a 3D point cloud. In certain embodiments, the frame 690 represents geometry of the 3D point cloud. In other embodiments, the frame 690 represents a texture of the 3D point cloud, such as color.

The interpolated frame 692 can be derived by the interpolating engine 462 of FIG. 4B based on the frame 690. The various methods of deriving and interpolating the pixels included in the frame 692 are discussed in greater detail below. Depending on whether the frame 690 represents geometry or texture of a point cloud, different methods are used to derive the pixels that were generated by the encoder (such as the encoder 410 of FIGS. 4A and 4B) but not included in the frame 690, which is received by the decoder (such as the decoder 450 of FIGS. 4A and 4C). In certain embodiments, the interpolating engine 462 of FIG. 4C derives the pixels that are missing from the frame 690. The derived pixels are represented in the interpolated frame 692.

The frame 600, of FIG. 6B, includes pixels 601-636 and represents one layer of a 3D point cloud, such as the frame $D_0$. The frame 650, of FIG. 6B, includes pixels 651-686 and represents another layer of a 3D point cloud, such as the frame $D_1$. In this example, the first layer, $D_0$, is near the projection plane and the second layer $D_1$ is further from the projection plane. The first layer and the second layer are separated by the surface thickness that limits the maximum difference between consecutive layer depth values. For instance, the frame 600 includes pixels from the near layer ($D_0$) while the frame 650 includes pixels from the far layer ($D_1$).

In certain embodiments, metadata (that was included in the bitstream 430) can include a patch identifier. A patch identifier associates each pixel within the frame 690 to a particular patch. In certain embodiments, metadata (that was included in the bitstream 430) can indicate the number of layers that are included in the frame 690. In other embodiments, the interpolating engine 462 identifies the number of layers by inspecting the layers associated with each pixel that is included in the frame 690.

The interpolating engine 462 identifies each missing values from the frame 690. When a pixel is included in the frame 690, the interpolating engine 462 identifies that a corresponding pixel from another layer is missing. For example, when the pixel 601 (from the layer $D_0$), is included in the frame 690, the interpolating engine 462 determines that a corresponding pixel, such as the pixel 651 (from the layer $D_1$) is missing. In another example, when the pixel 652 (from the layer $D_1$), is included in the frame 690, the interpolating engine 462 determines that a corresponding pixel, such as the pixel 602 (from the layer $D_0$) is missing. That is, for each pixel that is included in the frame 690, a corresponding pixel is missing at another layer.

For each missing pixel that is identified, the interpolating engine 462 derives a value associated with the pixel. To derive a value for each missing pixel, the interpolating engine 462 first identifies the attribute the frame 690 is representing. For example, depending on whether the frame 690 is a geometry frame or a texture frame, the interpolating engine 462 performs different steps to identify the missing pixels.

In certain embodiments, the interpolating engine 462 identifies neighboring pixels from the same layer of a missing pixel. For example, when the pixel 608 (from the layer $D_0$), is included in the frame 690, the interpolating engine 462 determines that a corresponding pixel, such as the pixel 658 (from the layer $D_1$) is missing. The neighboring pixels of the missing pixel 658, which are included in the frame 690, include the pixel 652 (from the layer $D_1$), the pixel 657 (from the layer $D_1$), the pixel 659 (from the layer $D_1$), and the pixel 664659 (from the layer $D_1$). The interpolating engine 462 then determines whether any of the pixels 652, 657, 659, and 664 belong to the same patch as the missing pixel 658, based on the patch identifier associated with each of the neighboring pixels. For each of the identified neighboring pixel that is not included in the same patch as the missing pixel 658, that pixel is excluded and not used in determining the value of the missing pixel 658.

In another example, when the pixel 657 (from the layer $D_1$), is included in the frame 690, the interpolating engine 462 determines that a corresponding pixel, such as the pixel 607 (from the layer $D_0$) is missing. The interpolating engine 462 identifies the neighboring pixels of the missing pixel 607 as the pixel 601 (from the layer $D_0$), the pixel 608 (from the layer $D_0$), and the pixel 613 (from the layer $D_0$). Only three pixels are identified as neighboring pixels since the missing pixel is on the boarder of the frame 690. The interpolating engine 462 then determines whether any of the pixels 601, 608, and 613 belong to the same patch as the missing pixel 607, based on the patch identifier associated with each of the neighboring pixels. For each of the identified neighboring pixel that is not included in the same patch as the missing pixel 607, that pixel is excluded and not used in determining the value of the missing pixel 607.

When the frame 690 represents a geometry frame, the interpolating engine 462 derives the value of a missing pixel differently depending on whether the missing pixel is from the first layer, $D_0$, or the second layer, $D_1$. For a missing pixel from the first layer, $D_0$, the interpolating engine 462 identifies a minimum value of the neighboring pixels that are from the same patch as the missing pixel. The missing point is then assigned the identified minimum value. For example, the interpolating engine 462 determines that the pixel 609 (from the layer $D_0$) is missing from the frame 690 (since the pixel 659 is included in the frame 690). It is noted that the pixel 609 and the pixel 659 are located at the same position (column 1, row 2) of the frame 690. The neighboring pixels of the missing pixel 609 include the pixels 603, 608, 610, and 615. When the pixels 603, 608, 609 610, and 615 all belong to the same patch, based on the patch identifier, the interpolating engine 462 identifies the minimum value associated with the neighboring pixels 603, 608, 610, and 615. Each pixel that belongs to a different patch that is different than the pixel 609 belongs to, is not included when the interpolating engine 462 identifies the minimum value associated with the neighboring pixels.

For a missing pixel from the second layer, $D_1$, the interpolating engine 462 determines an average value of the neighboring pixels that are from the same patch as the missing point. The missing pixel is assigned the derived average value of the neighboring pixels. For example, the interpolating engine 462 determines that the pixel 658 (from the layer $D_1$) is missing from the frame 690 (since the pixel 608 is included in the frame 690). It is noted that the pixel 658 and the pixel 608 are located at the same position (column 1, row 1) of the frame 690. The neighboring pixels of the missing pixel 658 include the pixels 652, 657, 659, and 664. When the pixels 652, 657, 658, 659, and 664 all belong to the same patch, based on the patch identifier associated with each pixel, the interpolating engine 462 averages the value of the pixels 652, 657, 659, and 664. Each pixel that belongs to a different patch that is different than the pixel 658 belongs to, is not included when the interpolating engine 462 derives the average value associated with the neighboring pixels.

After deriving the missing geometry points from the frame 690, the interpolating engine 462 derives the missing texture pixels. In certain embodiments, to derive the missing texture pixels, the interpolating engine 462 determines an average value associated with the neighboring pixels that boarder the missing texture pixel. In contrast to a geometry pixel, the interpolating engine 462 determines an average value for a missing texture pixel, regardless if the missing texture pixel is from the first layer or the second layer. The average value associated with the neighboring pixels that boarder the missing texture pixel is assigned as the value of the missing texture.

In certain embodiments, to derive the missing texture pixels, the interpolating engine 462 first generates the frames 600 and 650 which represent geometry of the 3D point cloud. After the frames 600 and 650 which represent geometry of the 3D point cloud are generated, the interpolating engine 462 determines whether a pixel in the frame 600, at a first location (based on a column number and a row number), matches a pixel in the frame 650 at the same location. For example, the interpolating engine 462 determines whether the value of the pixel 601, from the frame 600, and the value of the pixel 651, of the frame 650 are identical. Since the pixel 601 and 651 correspond to the same location in the frames, but at different layers, indicates that one of those pixels were interpolated. As discussed above, an interleaved geometry frame will have a corresponding interleaved texture frame. As such, if the pixel 601 in a geometry frame is known, then the pixel 651 in a geometry frame is interpolated. Alternatively, if the pixel 651 in a geometry frame is known, then the pixel 601 in a geometry frame is interpolated. Consequently, if a pixel 601 in a texture frame is known, then the corresponding pixel 651, representing texture is missing. That is, a texture pixel that is missing corresponds to the geometry pixel that is interpolated, while a texture pixel that is included in a received frame (similar to the frame 690) corresponds to a geometry pixel that is included in a received frame, (similar to the frame 690).

When the values of the two geometry pixels are identical the corresponding missing texture is assigned the value of the texture pixel that is received in the frame 690. When the values of the two geometry pixels are not identical, the interpolating engine 462 determines an average value associated with the neighboring pixels of the missing texture pixel. The neighboring pixels include only the pixels that belong to the same patch as the missing pixel. The derived average value is assigned as the value of the missing pixel.

In certain embodiments, to derive the missing texture pixels, the reconstruction engine 464 applies a texture from a nearest geometry point that includes texture to a geometry point that is missing texture. For example, the reconstruction engine 464 reconstructs the geometry of the 3D point cloud. The reconstruction engine 464 uses the derived missing geometry pixels (such as the pixels included in the frame 692) and the received geometry pixels (such as the pixels included in the frame 690). After the geometry of the 3D point cloud is reconstructed, the reconstruction engine 464 can apply the texture values based on the pixels included in the received interleaved texture frame (such as the frame 690). Since the frame 690 includes only a portion of the pixels, certain geometry points of the 3D point cloud will not have a texture applied to them. The reconstruction engine 464 can identify a geometry point in the 3D point cloud, that was not interpolated (such as a pixel included in the frame 690) that is closed to an interpolated geometry point in the 3D point cloud (such as a pixel included in the frame 692). The interpolated geometry point will not have a texture applied to it while the geometry point that was not interpolated will have a texture applied to it. The reconstruction engine 464 applies the texture of the geometry point (that was not interpolated) that is closest to the interpolated geometry point.

In certain embodiments, when two or more geometry points, that were not interpolated, are identified as the closest to an interpolated geometry point, the reconstruction engine 464 averages the texture of each of the closest geometry points. In other embodiments, when two or more geometry points, that were not interpolated, are identified as the closest to an interpolated geometry point, the reconstruction engine 464 selects one of the geometry points and applies the texture of the selected geometry point to that of the interpolated geometry point.

FIG. 6B illustrates the separation of pixels from different layers into frames that that includes pixels from single layer. For example, the frame 690 and the interpolated frame 692, include pixels from different layers. The frame 600 includes the pixels from the first layer within the frame 690 and the interpolated frame 692 while the generated frame 650 includes the pixels from the second layer within the frame 690 and the interpolated frame 692. The generated frames 600 and 650 correspond to the frames 500 and 550 of FIG. 5, respectively. In certain embodiments, the reconstruction engine 464 of FIG. 4C uses the generated frames 600 and 650 to reconstruct the point cloud, based on attribute associated with the frames. In certain embodiments, the reconstruction engine 464 of FIG. 4C uses the frame 690 and the interpolated frame 692 to reconstruct the point cloud, based on attribute associated with the frames (and the generated frames 600 and 650 are not generated).

Although FIGS. 6A and 6B illustrates one example of interpolating missing pixels and generating frames, various changes can be made to FIG. 6. For example, any number of pixels can be included in the frame 690 and any number of layers can be represented in the frame 690.

Figure 7:
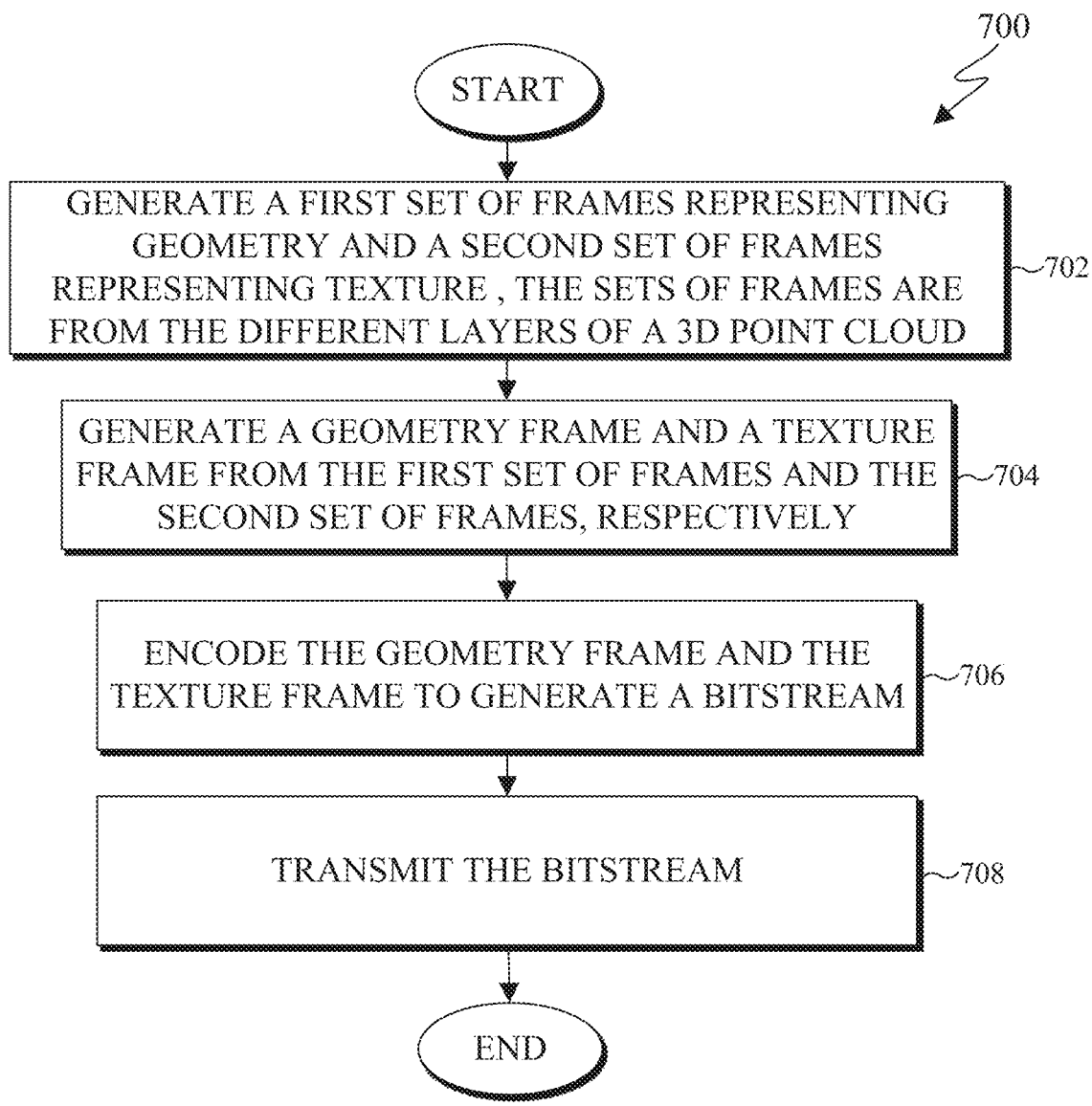
FIG. 7 illustrates an example flowchart for encoding a point cloud in accordance with an embodiment of this disclosure.

FIG. 7 illustrate example method 700 for encoding a point cloud in accordance with an embodiment of this disclosure The method 700 can be performed by the server 104 or any of the client devices 106-116 of FIG. 1, the server 200 of FIG. 2, the electronic device 300 of FIG. 3, the encoder 410 of FIGS. 4A and 4B, or any other suitable device or system. For ease of explanation, the method 700 is described as being performed by the encoder 410 of FIGS. 4A and 4B.

In step 702, the encoder 410 generates 2D frames for a 3D point cloud. The at least two 2D frames represent different attributes, respectively, of the 3D point cloud. For example, a first set of frames can represent geometry of the 3D point cloud, while a second set of frames can represent a texture of the 3D point cloud. The first set of frames representing geometry includes pixels that indicate geographic position of each point in the 3D point cloud. the second set of frames representing texture includes pixels that indicate a texture value that is associated with each geographic point, respectively. The first set of frames and the second set of frames also include multiple points that represent the 3D point cloud.

The first set of frames and the second set of frames include multiple frames that represent pixels from different layers of the 3D point cloud. For example, the different layers represent at least two layers, one layer that near the projection plane and one layer that is a set distance from the first layer. The distance between the layers is the surface thickness.

In certain embodiments, the encoder 410 also generates a patch identifier. The patch identifier associates each point within the sets of frames to a particular patch. For example, the encoder 410 generate a single patch identifier for all of the points within a frame. In another example, the encoder 410 generates a patch identifier for each pixel within a frame.

When generating the first set of frames and the second set of frames, the encoder 410 organizes the points of the 3D point cloud into each frame. For example, the various points can be positioned within a frame based on a row and column index, such that each pixel within a frame is identifiable by a row number and a column number. For a given row number and column number of one frame, a corresponding row number of column number is present in the second frame. In certain embodiments, each pixel within a frame is associated with a patch identifier in addition to a row number and a column number.

In step 704, the encoder 410 generates a geometry frame by combining pixels from the first set of frames, and generates a texture frame by combining pixels from the second set of frames. The geometry frame represents an interleaved frame as the points from the first set of frames are combined to generate a single frame. Similarly, the texture frame represents an interleaved frame as the points from the second set of frames are combined to generate a single frame that represents geometry of the 3D point cloud.

To generate the geometry frame, the encoder 410 interleaves alternating points from each frame included in the first set of frames. In certain embodiments, to generate the geometry frame, the encoder 410 adds the row number and the column number of a point together. Depending on whether the sum of the row number and the column number is even or odd determines whether the point is included in the geometry frame or whether the point is excluded from the geometry frame, based on the layer number of each frame. For example, if there are two frames within the first set of frames then each frame represents a different layer within the set of geometry frames. When the sum of the row and column, is even then the point from one frame is included in the geometry frame while the point from the other frame is excluded from the geometry frame. For instance, the geometry frame can include pixels that are associated with an even value from one layer and exclude pixels that are associated with an odd value from another layer.

To generate the texture frame, the encoder 410 interleaves alternating points from each frame included in the second set of frames. In certain embodiments, to generate the texture frame, the encoder 410 adds the row number and the column number of a point together. Depending on whether the sum of the row number and the column number is even or odd determines whether the point is included in the texture frame or whether the point is excluded from the texture frame, based on the layer number of each frame. For example, if there are two frames within the second set of frames then each frame represents a different layer within the set of texture frames. When the sum of the row and column, is even then the point from one frame is included in the texture frame while the point from the other frame is excluded from the texture frame. For instance, the texture frame can include pixels that are associated with an even value from one layer and exclude pixels that are associated with an odd value from the another layer.

In certain embodiments, to generate the texture frame the encoder 410 first generates then encodes the geometry frame. Thereafter, the encoder 410 decodes the geometry frame, and interpolates the missing geometry points from the geometry frame. In certain embodiments, interpolating the missing geometry points from the geometry frame includes recreating the first set of frames. The process of encoding and decoding the geometry frame ensures that points within the 3D point cloud are not shifted. After interpolating the missing geometry points, the encoder 410 reconstructs the geometry of the 3D point cloud. The encoder 410 then generates the set of text frames based on the reconstructed geometry of the 3D point cloud. After generating the set of texture frames, the encoder 410 interleaves the pixels (or points) from the set of texture frames to generate the texture frame.

In step 706, the encoder 410 encodes the interleaved geometry frame and the interleaved texture frame to generate a compressed bitstream. In step 708, the encoder 410 transmits the compressed bitstream. The compressed bitstream can be ultimately transmitted to a decoder, such as the decoder 450.

Although FIG. 7 illustrates one example of a method 700 for point cloud encoding, various changes may be made to FIG. 7. For example, while shown as a series of steps, various steps in FIG. 7 could overlap, occur in parallel, or occur any number of times.

Figure 8:
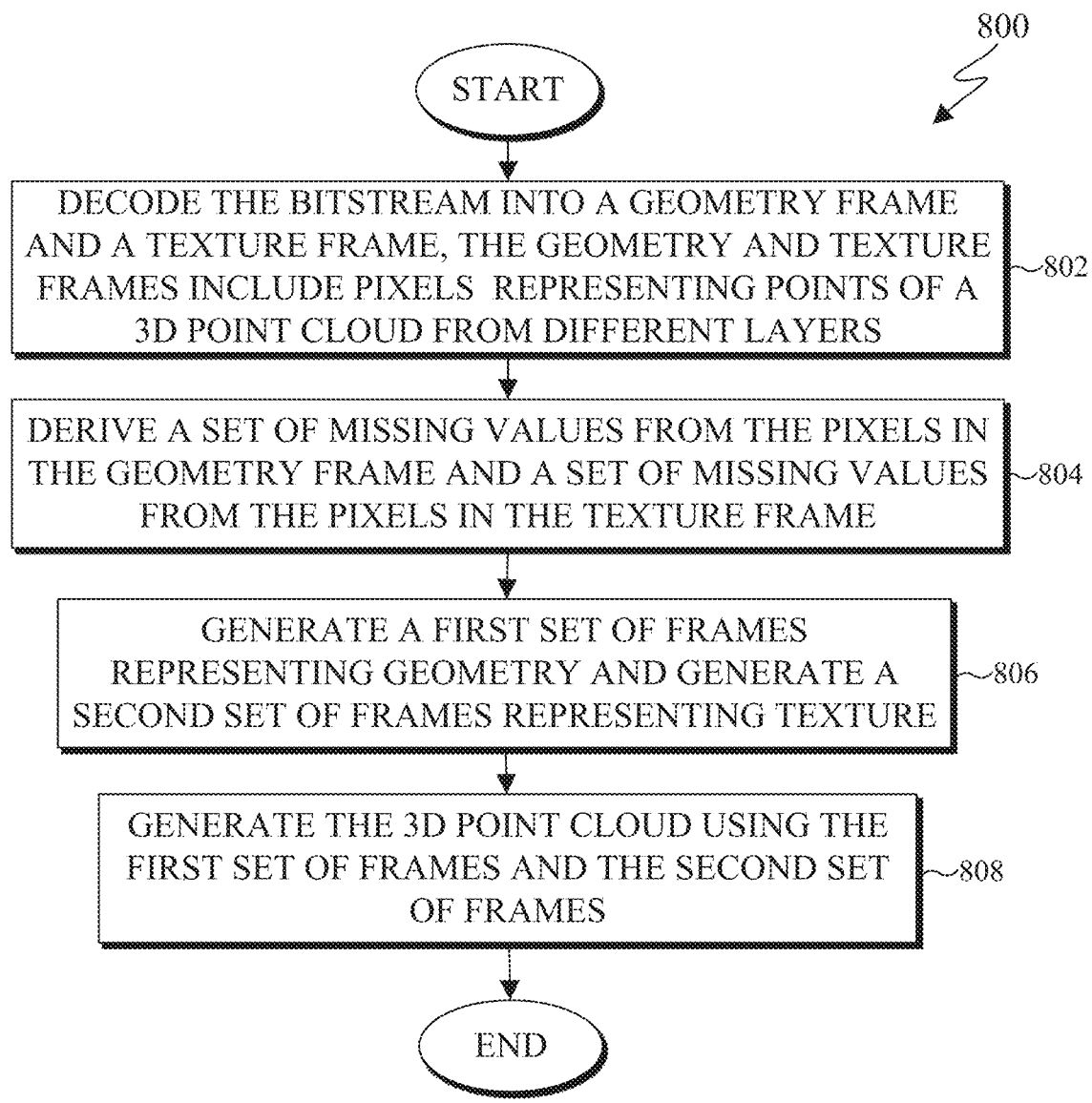
FIG. 8 illustrates an example flowchart for decoding a point cloud in accordance with an embodiment of this disclosure.

FIG. 8 illustrate example method 800 for decoding a point cloud in accordance with an embodiment of this disclosure The method 800 can be performed by the server 104 or any of the client devices 106-116 of FIG. 1, the server 200 of FIG. 2, the electronic device 300 of FIG. 3, the decoder 450 of FIGS. 4A and 4C, or any other suitable device or system. For ease of explanation, the method 800 is described as being performed by the decoder 450 of FIGS. 4A and 4C.

In step 802, a decoder, such as decoder 450, receives a compressed bitstream. The received bitstream can include an encoded point cloud that was mapped onto multiple 2-D frames, compressed, and then transmitted and ultimately received by the decoder. The decoder 450 then decodes the compressed bitstream. For example, the decoder 450 decodes the compressed bitstream into a geometry frame and a texture frame. The geometry frame includes pixels (or points) that represent points from different layers of the 3D point cloud. The texture frame includes pixels (or points) that represent points from different layers of the 3D point cloud. In certain embodiments, each pixel (or points) within the geometry frame and the texture frame is associated with a patch identifier.

In certain embodiments, the different layers include two layers, that of a near layer and a far layer. In other embodiments, the different layers include more than two layers. Regardless of the number of layers, each layer is related to another layer by a surface thickness.

In step 804, the decoder 450 derives a set of missing geometry values based on the pixels within the geometry frame and derives a set of missing texture values based on the pixels within the texture frame. When deriving the missing values, the decoder 450 determines whether a pixel, within the geometry frame or the texture frame, corresponds to the near layer or the far layer. When the values correspond to the near layer, then the decoder 450 determines that a second pixel corresponding to the far layer is missing. Alternatively, when the value corresponds to the far layer, the decoder 450 determines that a second pixel corresponding to the near layer is missing.

The decoder 450 identifies neighboring pixels of the missing pixel within the geometry frame or the texture frame. The decoder 450 can exclude one or more of the neighboring pixels dependent on whether the one or more of the neighboring pixels belong to the same patch as the missing pixel. For example, the decoder 450 identifies the patch number that the missing pixel belongs to, and inspects the patches that each of the neighboring pixels belong to. Each identified neighboring pixels that belongs to a different patch is excluded and not used to derive a value of the missing pixel.

When deriving the missing geometry pixels the decoder 450 uses the minim value associated with neighboring points when the missing pixel is from the near layer. When deriving the missing geometry pixels the decoder 450 uses the average value associated with neighboring pixels when the missing pixel is from the far layer.

In certain embodiments, the decoder 450 derives the missing texture values after deriving the missing geometry values. For example, when deriving the missing texture values, the decoder 450 determines whether the value of the geometry point from a first layer matches the value of the geometry point from a second layer. The geometry point from the near layer and the geometry point from the far layer are located at the same position within the geometry frames. When the value of the geometry point from the near layer matches the value of the geometry point from the far layer, the value associated with texture pixel, that is included in the texture frame is set as the value of the missing texture pixel. When the value of the geometry point from the near layer does not matches the value of the geometry point from the far layer, the decoder 450 uses the average value associated with neighboring pixels when the missing point is from the far layer.

In step 806, the decoder 450 generates a first set of frames and a second set of frames. The first set of frames represent geometry, where each frame in the first set of frames includes pixels associated with a particular layer. Similarly, the second set of frames represent texture, where each frame in the second set of frames includes pixels associated with a particular layer. For example, after deriving the set of missing geometry values, the decoder 450 creates separate frames for each layer based on the pixels represented by the set of missing geometry values and the pixels included in the received geometry frame. Similarly, after deriving the set of missing texture values, the decoder 450 creates separate frames for each layer based on the pixels represented by the set of missing texture values and the pixels included in the received texture frame.

For any pixel (denoted as first pixel) in a first frame representing a first layer, the decoder 450 identifies a pixel (denoted as second pixel) in a second frame representing a second layer based where the first pixel and the second pixel are located at the same position within the first frame and the second frame, respectively. The first layer can represent the near layer while the second layer represents the far layer. The first frame and the second frame can represent either the first set of frames, representing geometry, or the second set of frames, representing texture. Either the first point or the second point is interpolated while the other point is included in the bitstream since the first point and the second point correspond to the same position at different layers, as described in Syntax (1) and Equation (1), above.

When the first pixel corresponds to a missing value and included in the first frame (representing the first layer), indicates that the second pixel was received, and the decoder 450 performs two determinations. The decoder 450 determines whether a value of the first pixel, at the near layer is greater than a value of the second pixel from the far layer. If the value of the first pixel is less than the value of the second pixel, indicates that the interpolation of the first pixel was correct since the first pixel is closer to the projection plane than the second pixel. If the value of the first pixel is greater than the value of the second pixel, indicates that an error occurred during the interpolation as it indicates that a point from the near layer of the point cloud would be further away from the projection plane than the corresponding point on the far layer. When the value of the first pixel is greater than the value of the second pixel, the decoder 450 assigns the value of the second pixel as the value of the first pixel. The decoder 450 also determines whether a difference between the first pixel and the second pixel is greater than the surface thickness. The distance between the first pixel and the second pixel cannot be larger than the surface thickness. This condition limits the allowable distance between the first pixel and the second pixel to be no more than the surface thickness. When the difference between the first pixel and the second pixel is less than the surface thickness, indicates that that the interpolation of the first pixel was correct since the distance between the first pixel and the second pixel is within the surface thickness. For example, if the first pixel has a value of 15, the first pixel has a value of 19, and the surface thickness is set to 4, then 15 minus 19 yields 4, which indicates the interpolation was correct. In another example, if the first pixel has a value of 15, and the surface thickness is set to 4, then the second pixel can be a value of 15, 16, 17, 18, or 19. Therefore, if the second pixel minus the surface thickness is not 15, 16, 17, 18, or 19, indicates an error occurred during interpolation. When the difference between the first pixel and the second pixel is greater than the surface thickness indicates that an error occurred during the interpolation as it indicates that the distance between the first pixel and the second pixel is larger than the surface thickness. Therefore, when the difference between the first pixel and the second pixel is greater than the surface thickness, the decoder 450 sets the first value associated with the first pixel as a difference between the second value and the surface thickness.

Alternatively, when the first pixel corresponds to a missing value and included in the second frame (representing the second layer) the decoder 450 performs two different determinations. The decoder 450 determines whether a value of the first pixel, at the near layer is less than a value of the second pixel from the far layer. If the value of the first pixel is greater than the value of the second pixel, indicates that the interpolation of the first pixel was correct since the second pixel is closer to the projection plane than the first pixel. When the value of the first pixel is less than the value of the second pixel, decoder 450 assigns the value of the second pixel as the value of the first pixel. The decoder 450 also determines whether a difference between a value of the first pixel and a value of the second pixel is greater than the surface thickness. When difference between a value of the first pixel and a value of the second pixel is greater than the surface thickness, the decoder 450 sets the first value as a sum of the second value and the surface thickness.

In step 808, the decoder 450 generates the 3D point cloud using the first and second set of frames. For example, the decoder 450 extracts the information associated with each pixel within the first set of frames and generates the geometry of the 3D point cloud. Thereafter, the decoder 450 extracts the information associated with each pixel within the second set of frames and applies a texture to the geometry points.

In certain embodiments, while generating the 3D point cloud, the decoder 450 determines whether the distance between a point from the near layer and a corresponding point from the far layer is greater than a threshold. The distance can be based on the surface thickness. When the distance is greater than the threshold, the decoder 450 can generate one or more additional points between point of in the near layer and the point in the far layer. These additional points ensure that the point cloud appears full without any holes or cracks. After the additional points are added to the point cloud, the decoder 450 then applies texture the newly added additional points. The added texture can be based on the nearest neighbor of each additional geometry point, where the nearest neighbor includes a texture. For example, the nearest neighbor of an additional point is a geometry point that includes a texture that is either interpolated or received in the bitstream. For instance, if two additional points are added, the nearest neighbor of one of the added points is not the other added point.

Although FIG. 8 illustrates one example of a method 800 for point cloud decoding, various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a compressed bitstream; and
   a processor operably coupled to the communication interface, wherein the processor is configured to:
     decode the compressed bitstream into a geometry frame representing geometry of a three-dimensional (3D) point cloud and a texture frame representing texture of the 3D point cloud, wherein the geometry frame and the texture frame include pixels representing points of the 3D point cloud from different layers of the 3D point cloud,
     derive a set of missing geometry values from the pixels in the geometry frame and a set of missing texture values from the pixels in the texture frame, wherein the set of missing geometry values represent a set of points of the 3D point cloud that are not included in the geometry frame, and the set of missing texture values represent texture for the set of points of the 3D point cloud that are not included in the texture frame,
     generate a first set of frames representing geometry from the different layers of the 3D point cloud based on the geometry frame and the set of missing geometry values and generate a second set of frames representing the texture from the different layers of the 3D point cloud based on the texture frame and the set of missing texture values, and
     generate the 3D point cloud using the first set of frames and the second set of frames.

2. The decoding device of claim 1, wherein:
the different layers include a first layer and a second layer,
the first layer is related to the second layer by a surface thickness,
the processor is further configured to identify a patch identifier associated with the pixels included in the geometry frame and the texture frame, and
the patch identifier associates the pixels to a respective patch.

3. The decoding device of claim 2, wherein the processor is configured to:
determine whether a first pixel, within the geometry frame or the texture frame, corresponds to the first layer or the second layer;
when the first pixel corresponds to the first layer, determine that a second pixel corresponding to the second layer is missing;
when the first pixel corresponds to the second layer, determine that a third pixel corresponding to the first layer is missing;
after determining that the second pixel is missing, identify a first set of neighboring pixels of the first pixel, wherein the first set of neighboring pixels are from the second layer and correspond to a same patch as the second pixel, as indicated by the patch identifier; and
after determining that the third pixel is missing, identify a second set of neighboring pixels of the first pixel, wherein the second set of neighboring pixels are from the first layer and correspond to a same patch as the third pixel, as indicated by the patch identifier.

4. The decoding device of claim 2, wherein to derive the set of missing geometry values, the processor is configured to:
when a missing geometry value is from the first layer, determine a minimum value associated with neighboring pixels that border the missing geometry value from the geometry frame;
assign the minimum value to the missing geometry value;
when the missing geometry value is from the second layer, determine an average value associated with the neighboring pixels that border the missing geometry value; and
assign the average value to the missing geometry value, wherein the missing geometry value and the neighboring pixels belong to a same patch as indicated by the patch identifier, and belong to a same layer.

5. The decoding device of claim 2, wherein to derive the set of missing texture values, the processor is configured to:
generate the geometry of the 3D point cloud using the first set of frames;
after generating the geometry of the 3D point cloud, identify a first geometry point in the 3D point cloud, that is included in the geometry frame, that is nearest to a second geometry point that corresponds to a missing texture value from the pixels in the texture frame, wherein the second geometry point is included in the set of missing geometry values;
apply a texture, as indicated in the texture frame, to the points of the 3D point cloud including the first geometry point; and
after applying the texture, assign a texture value of the first geometry point to the second geometry point.

6. The decoding device of claim 2, wherein to derive the set of missing texture values, the processor is configured to:
after generating the first set of frames, determine whether a first pixel in a first frame of the first set of frames matches a second pixel in a second frame of the first set of frames, wherein the first pixel and the second pixel correspond to a same location within the first frame and the second frame;
when the first pixel matches the second pixel, assign a value from a third pixel in the texture frame to a missing texture value in another texture frame, wherein the missing texture value and the third pixel are at a same location as the first pixel and the second pixel, respectively;
when the first pixel does not match the second pixel, determine an average value associated with neighboring pixel of the missing texture value, wherein the missing texture value and the neighboring pixels belong to a same patch as indicated by the patch identifier and belong to a same layer; and
assign the average value to the missing texture value.

7. The decoding device of claim 2, wherein the processor is further configured to:
determine that the surface thickness is greater than a threshold;
when the surface thickness is greater than the threshold, generate additional geometry points between the first layer and the second layer; and
color the additional geometry points based on a value associated with a nearest neighbor point of each of the additional geometry points.

8. The decoding device of claim 1, wherein:
the different layers include a first layer and a second layer;
the first layer is related to the second layer by a surface thickness;
the processor is further configured to determine whether a first value, within the set of missing geometry values or the set of missing texture values, corresponds to the first layer or the second layer, wherein the first value represents a first pixel;
when the first pixel corresponds to the first layer, the processor is configured to:
identify a second pixel within the second layer that corresponds to a same location as the first pixel within the first layer, the second pixel represents a second value,
determine that the first value of the first pixel is greater than the second value of the second pixel,
after determining that the first value is greater than the second value, set the first value equal to the second value,
determine that a difference between the first value and the second value is greater than the surface thickness, and
after determining that the difference between the first pixel and the second pixel is greater than the surface thickness, set the first value as a difference between the second value and the surface thickness; and
when the first pixel corresponds to the second layer, the processor is configured to:
identify a third pixel within the first layer that corresponds to a same location as the first pixel within the second layer, the third pixel represents a third value,
determine that the first value of the first pixel is less that the third value of the third pixel,
after determining that the first value is less than the third value, set the first value equal to the third value,
determine that a difference between the first value and the third value is greater than the surface thickness, and
after determining that the difference between the first value and the third value is greater than the surface thickness, set the first value as a sum of the third value and the surface thickness.

9. The decoding device of claim 1, wherein:
the first set of frames include a first frame and a second frame and the second set of frames includes a third frame and a fourth frame;
the different layers include a first layer represented by the first frame and the third frame and a second layer represented by the second frame and the fourth frame; and
to generate the first set of frames and the second set of frames, the processor is configured to:
organize the pixels represented by the first layer from the geometry frame and the set of missing geometry values into the first frame and the pixels represented by the second layer from the geometry frame and the set of missing geometry values into the second frame, and
organize the pixels represented by the first layer from the texture frame and the set of missing texture values into the third frame and the pixels represented by the second layer from the texture frame and the set of missing texture values into the fourth frame.

10. An encoding device for point cloud encoding, the encoding device comprising:
a processor configured to:
generate, for a three-dimensional (3D) point cloud, a first set of frames representing geometry from different layers of the 3D point cloud and a second set of frames representing texture from the different layers of the 3D point cloud, wherein the first set of frames and the second set of frames include pixels representing the 3D point cloud,
generate a geometry frame by including a portion of the pixels included in the first set of frames and excluding a portion of the pixels included in the first set of frames,
generate a texture frame by including a portion of the pixels included in the second set of frames and excluding a portion of the pixels included in the second set of frames, and
encode the geometry frame and the texture frame to generate a compressed bitstream; and
a communication interface operably coupled to the processor, the communication interface configured to transmit the compressed bitstream.

11. The encoding device of claim 10, wherein:
the processor is further configured to generate a patch identifier associated with the pixels include in the first set of frames and the second set of frames, the patch identifier associates the pixels to a respective patch;
to generate the geometry frame, the processor is configured to interleave alternating pixels from frames included in the first set of frames; and
to generate the texture frame, the processor is configured to interleave alternating pixels from frames included in the second set of frames.

12. The encoding device of claim 10, wherein to generate the texture frame, the processor is configured to:
encode the geometry frame;
after encoding the geometry frame, decode the geometry frame;
after decoding the geometry frame, reconstruct geometry of the 3D point cloud;
generate the second set of frames representing the texture from the different layers of the 3D point cloud based on the reconstructed geometry of the 3D point cloud, the second set of frames includes a first frame and a second frame; and
interleave alternating pixels from the first frame and the second frame.

13. The encoding device of claim 10, wherein:
the first set of frames include a first frame and a second frame and the second set of frames includes a third frame and a fourth frame;
the different layers include a first layer represented by the first frame and the third frame and a second layer represented by the second frame and the fourth frame, wherein the first layer is related to the second layer by a predefined surface thickness; and
to generate the first set of frames and the second set of frames, the processor is configured to organize the pixels representing points of the 3D point cloud into rows and columns within the first set of frames and the second set of frames, and the pixels are respectively identifiable by a row number, a column number, and a patch.

14. The encoding device of claim 13, wherein:
to generate the geometry frame, the processor is configured to:
for a pixel included in the first frame and the second frame, add the row number to the column number to generate a value;
when the value associated with the pixel is even, include the pixel from the first frame to the geometry frame at a corresponding row number and a corresponding column number; and
when the value associated with the pixel is odd, include the pixel from the second frame to the geometry frame at the corresponding row number and the corresponding column number;
wherein to generate the texture frame, the processor is configured to:
for a pixel included in the third frame and the fourth frame, add the row number to the column number to generate a value;
when the value associated with the pixel is even, include the pixel from the third frame to the texture frame at a corresponding row number and a corresponding column number; and
when the value associated with the pixel is odd, include the pixel from the fourth frame to the texture frame at the corresponding row number and the corresponding column number.

15. A method for point cloud decoding, the method comprising:
receiving a compressed bitstream;
decoding the compressed bitstream into a geometry frame representing geometry of a three-dimensional (3D) point cloud and a texture frame representing texture of the 3D point cloud, wherein the geometry frame and the texture frame include pixels representing points of the 3D point cloud from different layers of the 3D point cloud;
deriving a set of missing geometry values from the pixels in the geometry frame and a set of missing texture values from the pixels in the texture frame, wherein the set of missing geometry values represent a set of points of the 3D point cloud that are not included in the geometry frame, and the set of missing texture values represent texture for the set of points of the 3D point cloud that are not included in the texture frame;

generating a first set of frames representing geometry from the different layers of the 3D point cloud based on the geometry frame and the set of missing geometry values and generating a second set of frames representing the texture from the different layers of the 3D point cloud based on the texture frame and the set of missing texture values; and generating the 3D point cloud using the first set of frames and the second set of frames.

16. The method of claim 15, wherein:

the different layers include a first layer and a second layer, the first layer is related to the second layer by a surface thickness, and the method further comprises identifying a patch identifier associated with the pixels included in the geometry frame and the texture frame, wherein the patch identifier associates the pixels to a respective patch.

17. The method of claim 16, further comprising:

determining whether a first pixel, within the geometry frame or the texture frame, corresponds to the first layer or the second layer;

when the first pixel corresponds to the first layer, determining that a second pixel corresponding to the second layer is missing;

when the first pixel corresponds to the second layer, determining that a third pixel corresponding to the first layer is missing;

after determining that the second pixel is missing, identifying a first set of neighboring pixel of the first pixel, wherein the first set of neighboring pixel are from the second layer and correspond to a same patch as the first pixel, as indicated by the patch identifier; and after determining that the third pixel is missing, identifying a second set of neighboring pixel of the first pixel, wherein the second set of neighboring pixel are from the first layer and correspond to a same patch as the first pixel, as indicated by the patch identifier.

18. The method of claim 16, wherein deriving the set of missing texture values comprises:

generating the geometry of the 3D point cloud using the first set of frames;

after generating the geometry of the 3D point cloud, identifying a first geometry point in the 3D point cloud, that is included in the geometry frame, that is nearest to a second geometry point that corresponds to a missing texture value from the pixels in the texture frame, wherein the second geometry point is included in the set of missing geometry values;

applying a texture, as indicated in the texture frame, to the points of the 3D point cloud including the first geometry point; and after applying the texture, assigning a texture value of the first geometry point to the second geometry point.

19. The method of claim 16, wherein deriving the set of missing geometry values comprises:

when a missing geometry value is from the first layer, determining a minimum value associated with neighboring pixels that border the missing geometry value from the geometry frame;

assigning the minimum value to the missing geometry value;

when the missing geometry value is from the second layer, determining an average value associated with the neighboring pixels that border the missing geometry value; and assigning the average value to the missing geometry value, wherein the missing geometry value and the neighboring pixels belong to a same patch as indicated by the patch identifier, and belong to a same layer.

20. The method of claim 16, further comprising:

determining that the surface thickness is greater than a threshold;

when the surface thickness is greater than the threshold, generating additional geometry points between the first layer and the second layer; and coloring the additional geometry points based on a value associated with a nearest neighbor point of each of the additional geometry points.

* * * * *